(12) United States Patent
Blonigen et al.

(10) Patent No.: US 6,838,069 B2
(45) Date of Patent: Jan. 4, 2005

(54) APPARATUS AND METHOD FOR AMMONIA REMOVAL FROM WASTE STREAMS

(75) Inventors: Scott J. Blonigen, Hilliard, OH (US); Alex G. Fassbender, West Richland, WA (US); Robert D. Litt, Westerville, OH (US); Bruce F. Monzyk, Delaware, OH (US); Richelle Neff, San Antonio, TX (US)

(73) Assignee: Battelle Memorial Institute, Columbus, OH (US)

( * ) Notice: Subject to any disclaimer, the term of this patent is extended or adjusted under 35 U.S.C. 154(b) by 131 days.

(21) Appl. No.: 10/346,896

(22) Filed: Jan. 17, 2003

(65) Prior Publication Data

US 2003/0215377 A1 Nov. 20, 2003

Related U.S. Application Data

(63) Continuation of application No. 09/754,850, filed on Jan. 4, 2001, now abandoned, which is a continuation of application No. 09/052,450, filed on Mar. 31, 1998, now abandoned.
(60) Provisional application No. 60/042,175, filed on Mar. 31, 1997, and provisional application No. 60/060,079, filed on Sep. 25, 1997.

(51) Int. Cl.[7] ............................................ C02F 1/42
(52) U.S. Cl. ...................... 423/352; 210/269; 210/674; 210/681; 423/238; 423/517
(58) Field of Search ...................... 210/674, 681, 210/269; 423/517, 352, 238

(56) References Cited

U.S. PATENT DOCUMENTS

| 2,420,419 A | 5/1947 | Dudley |
| 2,500,291 A | 3/1950 | Liebel et al. |
| 3,436,352 A | 4/1969 | Revoir et al. |
| 3,454,503 A | 7/1969 | Blankenhorn et al. |

(List continued on next page.)

FOREIGN PATENT DOCUMENTS

| CA | 1112774 A | 11/1981 |
| DE | 2452409 A1 | 5/1975 |
| EP | 0638350 A2 | 2/1995 |
| FR | 1496059 | 9/1967 |
| GB | 125311 | 5/1919 |
| JP | 54-158373 A | 12/1979 |

OTHER PUBLICATIONS

Database WPI; Week 8005, Derwent Publications Ltd., London, GB; AN 80–08113C, XP002070873 & JP 54 158 373A (Toyota Cenr Res), Dec. 24, 1979. ABSTRACT.
Database WPI; Week 8425, Derwent Publications Ltd., London, GB; AN 84–157726, XP002071541 & SU 1 047 509 A (Gintsvemet Res), Oct. 15, 1983. ABSTRACT.

*Primary Examiner*—Stanley S. Silverman
*Assistant Examiner*—Jonas N. Strickland
(74) *Attorney, Agent, or Firm*—Klaus H. Wiesmann

(57) ABSTRACT

Apparatus, materials, and methods for removing ammonia from fluid using metal hydroxides (e.g. zinc hydroxide) and metal cation loaded media (e.g. zinc loaded ion exchange resins); the metal hydroxides and metal cation loaded media may be regenerated with a weak acid ($pK_a$ between 3 and 7). Alternatively, ammonia is removed from fluids by using $H_2SO_4$ and $ZnSO_4$ and metal cation loaded media; the metal cation loaded media may be regenerated with $H_2SO_4$ and $ZnSO_4$; the ammonia containing $H_2SO_4$ and $H_2SO_4$ may be concentrated as necessary to form $(NH_4)_2SO_4 \cdot ZnSO_4 \cdot 6H_2O$ (ammonium zinc sulfate hexahydrate) crystals. These crystals are removed from the mother liquor and heated to temperatures exceeding 200° C. releasing $NH_3$ and $H_2O$ vapor upon the decomposition of the crystals.

65 Claims, 13 Drawing Sheets

U.S. PATENT DOCUMENTS

| | | |
|---|---|---|
| 3,531,242 A | 9/1970 | Hayakawa et al. |
| 3,536,637 A | 10/1970 | Noll et al. |
| 3,842,000 A | 10/1974 | Dawson |
| 3,939,071 A | 2/1976 | Katzakian et al. |
| 3,941,693 A | 3/1976 | DePree |
| 3,948,769 A | 4/1976 | Dobbs |
| 3,984,313 A | 10/1976 | Higgins |
| 4,263,145 A | 4/1981 | Wirth, Jr. |
| 4,329,210 A | 5/1982 | Merchant et al. |
| 4,336,102 A | 6/1982 | Jacobs et al. |
| 4,686,198 A | 8/1987 | Bush et al. |
| 4,695,387 A | 9/1987 | Berry et al. |
| 4,758,250 A | 7/1988 | Laciak et al. |
| 5,165,247 A | 11/1992 | Rockenfeller et al. |
| 5,230,877 A | 7/1993 | Eimer et al. |
| 5,250,188 A | 10/1993 | Bruening et al. |
| 5,512,182 A | 4/1996 | Sheikh et al. |
| 5,571,657 A | 11/1996 | Szmanda et al. |

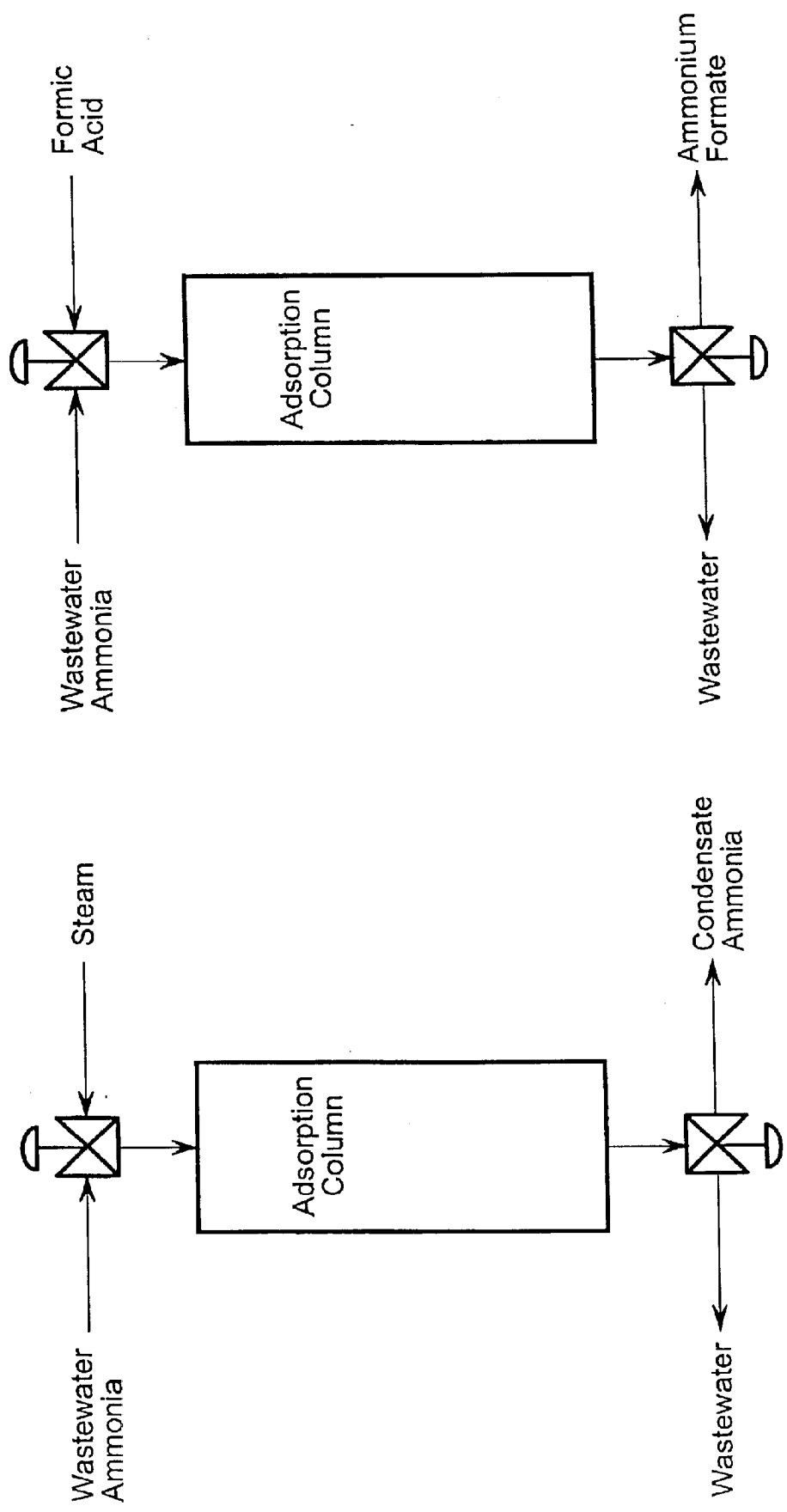

APPARATUS AND METHOD FOR AMMONIA REMOVAL FROM WASTE STREAMS

This application is a continuation application and claims the benefit of U.S. application Ser. No. 09/754,850 filed Jan. 4, 2001 which is now abandoned; which is a continuation application and claims the benefit of U.S. application Ser. No. 09/052,450 filed Mar. 31, 1998 which is now abandoned; which application claims the benefit of U.S. Provisional Application No. 60/042,175 filed Mar. 31, 1997, and U.S. Provisional Application No. 60/060,079 filed Sep. 25, 1997.

The entire content of U.S. application Ser. No. 09/754,850 and Ser. No. 09/052,450 including specification, claims, abstract, and drawings are hereby incorporated by reference as if fully rewritten herein.

FIELD OF THE INVENTION

The invention relates to methods, materials, and apparatus useful for reducing ammonia discharge from industrial and municipal waste streams and for ammonia recovery. One aspect of the invention involves ammonia absorption using activated zinc hydroxide. Another aspect of the invention involves ammonia absorption using sorbent for ligand exchange adsorption with a metal bound to a cation exchange resin. A further aspect of the invention involves the regeneration and reuse of absorption media.

Another aspect of the invention involves the direct treatment of ammonia waste streams with zinc sulfate and sulfuric acid and concentrating to cause crystallization of an ammonium zinc sulfate hydrate. Another aspect of the invention involves ammonia absorption using sorbent for ligand exchange adsorption with a metal bound to a cation exchange resin and the subsequent regeneration using zinc sulfate and sulfuric acid to form the ammonium zinc sulfate hydrate crystals. In both aspects, the crystals may then be heated to release $NH_3$ and regenerate the zinc sulfate and sulfuric acid.

BACKGROUND OF THE INVENTION

Ammonia in aqueous solution is present as an equilibrium system defined by:

$$NH_4^+ \rightleftarrows NH_3 + H^+$$

with an equilibrium constant of:

$$K_a = \frac{[NH_3][H^+]}{[NH_4^+]} = 5.848 \times 10^{-10}$$

at 20° C. Where $[NH_3]$ represents the concentration of dissolved neutral ammonia. Techniques available for the removal of ammonia from aqueous streams can normally only recover either the ionic $[NH_4^+]$ or gaseous form of ammonia $[NH_3]$. For efficient removal, adjusting the pH of the aqueous stream to a pH less than 7 or more than 11, maximizes the concentration of either the ionic or gaseous form of ammonia respectively. In actual practice, to maximize the concentration of gaseous ammonia, the pH is typically adjusted to a value greater than 11 using lime or sodium hydroxide.

The gaseous form of ammonia can be removed from water by air stripping where it is contacted with large volumes of air. As the volatility of ammonia increases with temperature, the current state-of-the art of air stripping occurs at higher temperatures. Many configurations of contacting equipment have been used, including countercurrent and crosscurrent stripping towers, spray towers, diffused aeration, and stripping ponds with and without agitation. The ammonia has been recovered from the air by contacting the ammonia-laden air with sulfuric acid solution to form a solution of ammonium sulfate.

Steam stripping has also been used commercially, especially in the removal of ammonia from sour waters. As with air stripping, steam stripping typically involves adjusting the pH to levels greater than 11 using lime or sodium hydroxide. One process for treating petroleum sour waters uses steam stripping which with further downstream processing results in the recovery of ammonia in an anhydrous form, see Leonard et al., "Treating acid & sour gas: Waste water treating process", *Chemical Engineering Progress*, October, (1984), pp. 57–60. Mackenzie and King, "Combined solvent extraction and stripping for removal and isolation of ammonia from sour waters", *Industrial Eng. and Chem. Research*, 24, (1985), pp. 1192–1200, have examined the combined use of steam stripping and solvent extraction for the removal of ammonia from sour waters with reduced steam consumption.

Cation exchange and zeolites have been used to recover the ammonium form of ammonia from aqueous streams, see for example Berry et al. "Removal of Ammonia From Wastewater", U.S. Pat. No. 4,695,387 (1987), and Wirth, "Recovery of ammonia or amine from a cation exchange resin", U.S. Pat. No. 4,263,145 (1981). For these uses the pH is typically adjusted to lower than neutral levels. Temperature plays a much less significant role than in stripping. The cation exchange resins or zeolites are then regenerated by treatment with metal hydroxide solutions to give gaseous ammonia for which the resins and zeolites have no affinity.

References in the literature appear for the use of liquid membranes, hollow fibers, and reverse osmosis to remove ammonia from aqueous streams, although none of these techniques have apparently been commercialized.

Ligand exchange adsorption has been used to recover ammonia. In ligand exchange adsorption, an ion exchange resin is loaded with a complexing metal ion such as $Cu^{2+}$, $Zn^{2+}$, $Ni^{2+}$, $Ag^+$, etc. (Helfferich, F., Ligand Exchange, I & II, Jnl. of the Am. Chem. Soc., No. 84, pp. 3237–3245, 1962). The metal ion then acts as a solid sorbent for ligands such as ammonia. In theory, each metal ion may adsorb a number of ligands up to its coordination number, normally 4 to 6. In practice, not all of these sites will be occupied by an ammonia molecule.

When applied to ammonia, ligand exchangers will only form complexes with the uncharged form of the ammonia. Dawson, in U.S. Pat. No. 3,842,000 (1974) applied ligand exchange to the removal of ammonia from aqueous streams. Dawson used $Cu^{2+}$ as the metal ion because of its high amine complex formation constant and Dowex™ A-1 as the ion exchange resin. Ammonia was adsorbed after adjusting the pH of the solution to 9–12 to increase the availability of dissolved gaseous ammonia. Contacting the ligand exchange resin with a solution of sulfuric, nitric, phosphoric, or hydrochloric acid regenerated the ligand exchange resin. However, metal is stripped from the resin with each regeneration when a strong acid is used (see immediately below).

Dobbs et al. in "Ammonia removal from wastewater by ligand exchange", *Adsorption and Ion Exchange*, AIChE Symposium Series, 71(152), (1975), pp. 157–163, examined the use of dilute hydrochloric acid and Jeffrey, M., *Removal of ammonia from wastewater using ligand exchange*, M. S. Thesis, Louisiana State University, (1977) (see Regeneration pp. 72–79), examined the use of dilute sulfuric acid as a regenerate for a $Cu^{2+}$ ligand exchange resin. Both dilute hydrochloric acid and dilute sulfuric acid were found to be ineffective as they leached the copper from the resin at unacceptably high levels. Both Jeffrey (1977) and Dobbs et al. (1975, 1976) attempted to use heat to remove the ammonia from the ligand exchange resin. Jeffrey's use of warm water up to 45° C. removed some ammonia, but failed to prove an effective regeneration agent. Dobbs et al. (1975, and in U.S. Pat. No. 3,948,842) used 30 psig (21,000 kg/m$^2$) steam as a regeneration agent. Although successful in regenerating most of the ligand exchange resins activity, the process was energy intensive and produced peak ammonia concentrations in the condensed steam of only 800 ppm.

An object of the invention is to provide an ammonia recovery process that is more economical than current methods for removal of ammonia from fluid streams.

Another object of the invention is to provide an ammonia recovery process that uses fewer chemicals than current processes or chemicals compatible with the original process application. Typically this involves regeneration and recycle of the sorbent material(s).

Another object of the invention is to reduce ammonia concentration in the effluent stream to very low levels (i.e. less than or equal to 10 ppm) or to control the ammonia concentration to meet environmental regulations.

BRIEF DESCRIPTION OF THE INVENTION

Broadly the invention discloses methods and apparatus for the removal of ammonia from fluids, particularly industrial and municipal waste streams. The waste streams may be gaseous or liquid streams.

I. First General Embodiment

A first embodiment of the invention includes a method for recovering ammonia from a fluid by the steps of: contacting the fluid with a sorbent of metal loaded media; separating the sorbent containing ammonia from the fluid; separating the ammonia from the sorbent by contacting the sorbent with a regenerant of a non-chelating weak acid, wherein an ammonium regenerant salt is formed. In further embodiments there may be additional steps including separating the ammonium from the ammonium regenerant salt to form ammonia and free regenerant. The additional steps may include separating the ammonia from the ammonium regenerant salt with a step selected from the group including: heating, applying a vacuum and a combination thereof. More preferably the separation of the ammonium from the regenerant salt is by the step of contacting with a strong acid to form regenerant and an ammonium strong acid salt; and separating the regenerant therefrom. Typically the method includes recycling the separated sorbent and/or recycling the separated regenerant. Typically the weak acid may be a weak organic acid. Preferably the weak acid has a $pK_a$ between about 3 and about 7. The method may be augmented by further treatment including contacting and reacting the separated ammonia with nitric acid to form ammonium nitrate; and heating the ammonium nitrate and reacting at a temperature and pressure under hydrothermal conditions to decompose the ammonium nitrate to substantially nitrogen gas and water.

A more specific description of the first embodiment includes a method for recovering ammonia from a fluid including the steps of contacting the fluid with a sorbent including a metal ion loaded media, in a manner adapted to sorb ammonia on the sorbent; separating the ammoniated sorbent and the fluid; separating the ammonia from the sorbent by contacting the ammoniated sorbent with a non-chelating weak acid to form an ammonium regenerant salt; separating the ammonia from the regenerant by one or more steps selected from the group including heating the ammonium/regenerant complex; applying a vacuum to the ammonia/regenerant complex; or contacting the ammonia/regenerant complex with a strong acid.

Sorbent types useful in the invention typically include acrylamides, aminophosphonates, aminodiacetates, carboxylates, chelators, phosphonates, diphosphonates, and sulfonates.

A second further embodiment of the invention includes apparatus for recovering ammonia from a fluid including: a container enclosing a metal loaded media, the metal loaded media able to reversibly sorb ammonia; one or more inlet valves at an inlet portion of the container for admitting fluid or regenerant to the container; one or more outlet valves for exiting treated fluid or reacted regenerant at an outlet portion of the container; and a source of regenerant that is a non-chelating weak acid, operatively connected to an inlet valve at the admitting portion of the container. A further embodiment of the apparatus typically includes an ammonia separator for receiving and separating ammonia from the regenerant, operatively connected to one of the outlet valves. A yet further embodiment includes a chemical reactor operatively connected to the ammonia separator, for reacting separated ammonia from the separator with a strong acid; and a regenerant separator, operatively connected to the reactor, for separating the regenerant from the strong acid. A yet further embodiment includes recycling apparatus for providing regenerant from the regenerant separator to the inlet valve. An additional embodiment includes apparatus for degrading the ammonia with a reactor for mixing and reacting nitric acid, operatively connected to the ammonia separator, for producing ammonium nitrate; and a hydrothermal reactor, operatively connected to the reactor, for degrading the ammonium nitrate to substantially gaseous nitrogen and water.

A yet further embodiment of the apparatus for recovering ammonia from a fluid includes means for enclosing a metal loaded media able to reversibly sorb ammonia; inlet means, at an inlet portion of the means for enclosing, for admitting fluid or regenerant; outlet means, at an outlet portion of the means for enclosing, for exiting treated fluid or reacted regenerant; and regenerant source means including a non-chelating weak acid, operatively connected to the inlet means. Additional embodiments can include means for separating ammonia from the regenerant, operatively connected to the outlet means.

Another embodiment for the apparatus includes reactor means for receiving ammonia from the means for separating ammonia and reacting with a strong acid and means for separating the regenerant from the strong acid. Typically the apparatus includes means for recycling the sorbent and/or regenerant. Other embodiments typically include means for separating ammonia from the reacted regenerant operatively connected to the outlet means. Additional apparatus includes means for reacting nitric acid, operatively connected to the means for separating ammonia, to produce ammonium nitrate; and means for hydrothermally reacting the ammonium nitrate, operatively connected to the means for reacting nitric acid, wherein the ammonium nitrate is reacted to essentially nitrogen and water.

Another embodiment of the invention includes methods for preparing metal loaded media including the steps of contacting the sorbent/resin with a solution of a soluble metal salt. The metal may be loaded at any pH where it is soluble. Loading is typically accomplished by increasing the metal ion concentration to the extent sufficient for outcompeting an $H^+$ ion at the sorbent/resin loading site A second embodiment of the invention includes methods and apparatus for recovery of ammonia from fluids based on a metal hydroxide sorbent. These methods typically include the steps of: contacting the fluid with a sorbent that is a solid metal hydroxide, so as to load ammonia on the sorbent; separating the sorbent loaded ammonia from the fluid; separating the ammonia from the sorbent by contacting the sorbent with a regenerant comprising a non-chelating weak acid, wherein an ammonium regenerant salt is formed, at conditions where metal hydroxide is not substantially removed. Typically there are two methods that may be used to assure that the metal hydroxide is not removed and is not available as a sorbent. First, the weak non-chelating acid is added at a rate that keeps the pH above the dissolution point of the metal hydroxide. Secondly, the weak non-chelating acid is added at a rate where the metal hydroxide is not dissolved out of the system because the ultimate overall pH of the system is still high enough to trap and reprecipitate the metal hydroxide. The second method would be an advantage in overcoming surface fouling problems. In further embodiments there may be additional steps including separating the ammonium from the ammonium regenerant salt. The additional steps may include separating the ammonia from the regenerant with a step selected from the group including: heating, applying a vacuum, and/or contacting the salt with a strong acid to form regenerant and an ammonium strong acid salt; and separating the regenerant therefrom. Typically the method includes recycling the separated sorbent and/or recycling the separated regenerant. In another embodiment the regenerant acid is typically a weak organic acid or a weak inorganic acid with a $pK_a$ between about 3 and about 7. The method may be augmented by further treatment including contacting and reacting the separated ammonia with nitric acid to form ammonium nitrate; and heating the ammonium nitrate and reacting at a temperature and pressure under hydrothermal conditions to decompose the ammonium nitrate to substantially nitrogen gas and water.

A yet further embodiment discloses methods for treating an air stream containing ammonia including contacting the air stream with a slurry made up of particles of activated metal hydroxide, the particles dispersed in a liquid; or particles of metal loaded media, the particles dispersed in a liquid; and regenerating the particles and recovering the ammonia. The particles are typically separated from the fluid stream before prior to regenerating the particles. The particles having spent regenerant thereon may typically be regenerated with heat, a vacuum, with a weak acid, or a combination thereof. When activated metal hydroxide is selected, the additional step of regenerating the media with a weak acid must be made while maintaining the pH level above that where metal is stripped from the metal hydroxide particle.

Generally this is accomplished by slow addition of weak acid and while maintaining the overall pH above 6 and most preferably above 7.

II. Second General Embodiment

A first embodiment of the invention includes a method for recovering ammonia from a fluid by the steps of contacting the fluid with a sorbent of metal-loaded media, separating the ammonia-containing sorbent from the fluid, separating the ammonia from the sorbent by contacting the sorbent with a stripping solution of a strong acid and a metal salt, wherein an ammonium salt is formed with the metal salt in a spent regeneration solution, separating the spent regeneration solution and treating it to crystallize an ammonium-metal double salt therefrom. Typically, the crystallization is accomplished by increasing the concentration of the ammonium salt and metal salt in the spent regeneration solution by evaporation or by decreasing the temperature of highly concentrated solutions. If desired crystallization may be controlled by seeding.

Preferably the metal cation loaded on the metal-loaded media is den ed from Ag, Al, Ca, Ce, Cd, Co, Cr, Cu, Fe (II and III), Hg, Mg, Mn, Ni, Pd, Zn, Zr. The metal cations may be used alone or in combination with one or more other metal cations. Preferably, the cation in the metal salt of the stripping solution derives from Ag, Al, Ca, Ce, Cd, Co, Cr, Cu, Fe (II and III), Hg, Mg, Mn, Ni, Pd, Zn, Zr. The metal cations may be used alone or in combination with one or more other metal cations. Preferably, at least some of the metal cations loaded on the metal-loaded media and the metal cations in the metal salt of the stripping solution are the same. More preferably, they are all the same. Zinc is preferred because of its nontoxic character in relation to animals and humans and its solubility properties as a salt and double salt.

Preferably, the strong acid in the stripping solution is sulfuric, sulfurous, phosphoric and/or hydrochloric. More preferably, the strong acid is sulfuric. Typically, the anion in the metal salt used in the stripping solution matches the anion of the strong acid.

Preferably, concentration of the ammonium salt and metal salt in the spent regeneration solution is increased above the solubility limit of the ammonium-metal double salt with a step selected from the group including: heating, applying a vacuum and a combination thereof. More preferably, these conditions will include seeding with recycled ammonium sulfate crystals to minimize scaling and to control crystallization rate and crystal size.

In further embodiments there may be additional steps including separating the ammonia from the double salt and recycling the stripping solution. The additional steps may include separating the ammonia from the ammonium-metal double salt by decomposition with heat.

Sorbent types useful in the invention typically include polymers of acrylamides containing metal complex groups of aminophosphonates, aminodiacetates, carboxylates, phosphonates, diphosphonates, and/or sulfonates including chelators made therefrom and mixtures of the foregoing.

A more preferred embodiment includes contacting an ammonia-laden wastewater stream with a zinc-loaded cation exchange resin to adsorb the ammonia, separating the zinc-loaded cation exchange resin containing the adsorbed ammonia and stripping the ammonia with a stripping solution of $ZnSO_4$ and $H_2SO_4$ to form a spent regeneration solution of ammonium sulfate and zinc sulfate, and crystallizing zinc ammonium sulfate hydrate therefrom. The method preferably includes recovering the zinc ammonium sulfate hydrate and decomposing to recover ammonia. More preferably, zinc sulfate and sulfuric acid are recovered from the decomposition and recycled.

Crystallization of the zinc ammonium sulfate hydrate preferably includes evaporation of the spent regeneration solution in conventional manner by, for example, heating, vacuum or a combination of the two, and subsequent cooling. The amount of evaporation and cooling required depends upon the initial concentration of the ammonia. If the ammonia concentration is high enough (resulting in ammonium zinc sulfate hydrate concentration above the solubility limit) no evaporation may be required.

The crystals are preferably decomposed by heating wherein water and ammonia vapors are released. Typically, the decomposition includes heating at a lower temperature to remove water, and subsequently heating at a second higher temperature to remove ammonia. In certain situations, it may also be useful to drive the reaction further to release the $SO_2/SO_3$ and to then capture the gas as ammonium sulfate in conventional ways.

The ammonia may be captured as ammonia by condensation (particularly by multiple effect condensation) or as a salt by using an acid stripper. The acid stripper (for example, phosphoric or nitric) can be selected to enhance the market value of the ammonia. After crystallization of the spent regeneration solution, the remaining aqueous liquid may be further processed to recover ammonium sulfate or it may be recycled back directly for ammonia stripping.

A second embodiment of the invention includes methods and apparatus for direct reduction of ammonia from waste streams by reacting an aqueous ammonia stream with a stripping solution of a strong acid and a metal salt, wherein an ammonium salt is formed with the metal salt in a spent regeneration solution, separating the spent regeneration solution and treating it to crystallize an ammonium-metal double salt therefrom. Typically, the crystallization is accomplished by increasing the concentration of the ammonium salt and metal salt in the spent regeneration solution by evaporation or by decreasing the temperature of highly concentrated solutions.

Preferably, the cation in the metal salt of the stripping solution derives from Ag, Al, Ca, Ce, Cd, Co, Cr, Cu, Fe (II and III), Hg, Mg, Mn, Ni, Pd, Zn, Zr. The metal cations may be used alone or in combination with one or more other metal cations. Zinc is preferred because of its nontoxic character in relation to animals and humans and its solubility properties as a salt and double salt.

Preferably, the strong acid in the stripping solution is sulfuric, sulfurous, phosphoric and/or hydrochloric. More preferably, the strong acid is sulfuric. Typically, the anion in the metal salt used in the stripping solution is substantially the same anion as in the strong acid.

Preferably, concentration of the ammonium salt and metal salt in the spent regeneration solution is increased above the solubility limit of the ammonium-metal double salt with a step selected from the group including: heating, applying a vacuum and a combination thereof. Optionally, the process will include seeding with recycled ammonium sulfate crystals to minimize scaling and to control crystallization rate and crystal size.

In further embodiments there may be additional steps including separating the ammonia from the double salt and recycling the stripping solution substantially the same as described above for recovery of ammonia from the double salt in the first embodiment. The additional steps may include separating the ammonia from the ammonium-metal double salt by decomposition with heat.

A more preferred process for the direct reduction of ammonia from a waste stream includes reacting an aqueous ammonia stream with a zinc sulfate and sulfuric acid solution to produce a spent regeneration solution of zinc sulfate and ammonium sulfate and treating such solution to cause crystallization of zinc ammonium sulfate hydrate. Preferably, the crystallization is caused by concentrating the stream by removing water. Typically this is accomplished by evaporation by conventional heating, vacuum or a combination of the two. The crystallization may also be caused by reducing the temperature of the zinc sulfate/ammonium sulfate solution or by a combination of concentration and cooling.

The method may also include cooling the solution below the crystallization temperature and continuously or sequentially separating the crystals of zinc ammonium sulfate hydrate. Multiple crystallization steps may be used. Optionally, the method may also include recovering zinc from the liquid remaining from the crystallization step, preferably with a cation exchange resin or using liquid-liquid extraction, for example, and sulfuric acid regeneration, depending on the zinc concentration.

The method may also include the recovery of ammonia by decomposition of the zinc ammonium sulfate hydrate crystals to release $NH_3$ and $H_2O$, and may further include recovery of the remaining zinc sulfate and sulfuric acid, which are recycled. The decomposition step may preferably comprise heating the crystals at a lower temperature to remove water, and raising the temperature to a higher level to remove ammonia. Ammonia vapor may preferably be condensed to recover the ammonia or recovered as a salt by stripping with an acid.

The invention also includes apparatus for recovering ammonia from a fluid including: a fluid-contacting device containing an ammonia sorbent of metal-loaded media, means for contacting the ammonia-containing fluid with the ammonia sorbent and sorbing the ammonia thereon, means for removing the ammonia-depleted fluid from the contacting device, means for contacting the ammonia-loaded sorbent with a stripping solution of a strong acid and a metal salt to form a spent regeneration solution of ammonium salt and metal salt, and means for treating the spent regeneration solution to crystallize an ammonium-metal double salt therefrom. Typically, the apparatus also may include an evaporator for increasing the concentration of the ammonium salt and metal salt in the spent regeneration solution and/or a cooling device for cooling the spent regeneration to cause crystallization. The evaporator and the cooling device may be the same piece of apparatus.

The apparatus may also include one or more heating devices for decomposing the crystals to release the water and ammonia vapors. Typically, the apparatus also includes a condenser to recover the ammonia vapor or a contacting device to capture ammonia as a salt by using an acid stripper.

A yet further embodiment discloses methods for treating an air stream-containing ammonia including contacting the air stream directly with an aqueous stream of zinc sulfate and sulfuric acid or with particles of metal-loaded media which are thereafter stripped of ammonia by contact with a zinc sulfate/sulfuric acid solution; crystallizing ammonium zinc sulfate hydrate from the solution, and decomposing the latter to release the ammonia and regenerate the stripping solution.

The invention includes every novel feature and every novel combination of features disclosed in the specification herein.

BRIEF DESCRIPTION OF THE DRAWINGS

FIG. 12 is a schematic drawing of apparatus for ammonia removal using ligand exchange adsorption with steam regeneration.

FIG. 13 is a schematic drawing of apparatus for ammonia removal using ligand exchange adsorption with formic acid regeneration.

DETAILED DESCRIPTION OF THE INVENTION AND BEST MODE

I. First General Embodiment

Figure 1:
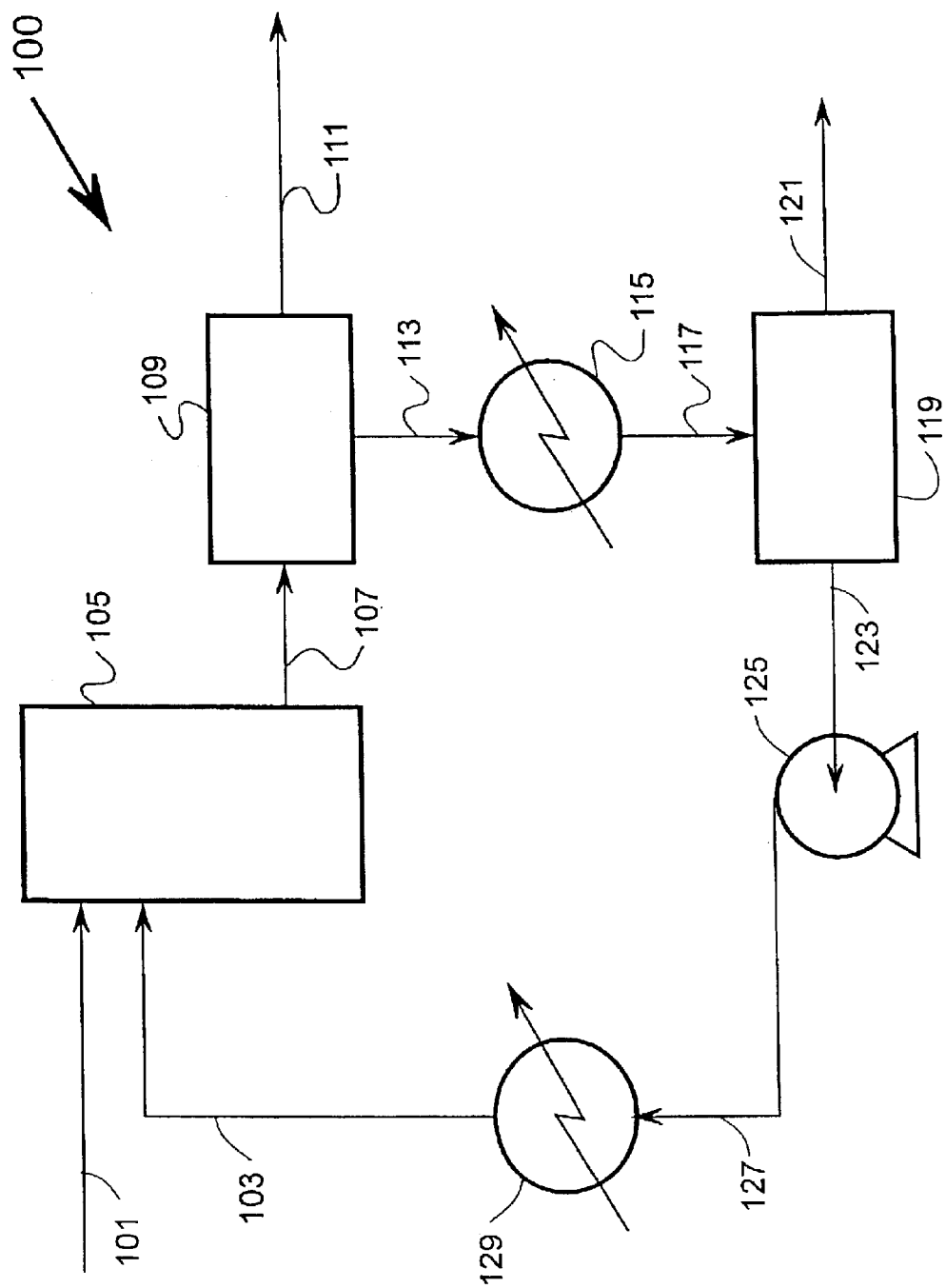
FIG. 1 is a schematic drawing of a zinc hydroxide recovery process only.

Broadly the invention includes methods, materials, and apparatus for removing ammonia from fluid streams. The fluid streams include gaseous and liquid streams. When gaseous streams are used the ammonia from the gaseous stream is first extracted into a liquid stream and then extracted from the liquid stream.

Two main embodiments for ammonia recovery are disclosed herein. The first uses zinc hydroxide for contacting a fluid stream and the second uses a metal loaded ion exchange medium for contacting the fluid stream. Both embodiments are able to reversibly bind ammonia so that overall costs for the methods are reduced. For example, a zinc hydroxide slurry can absorb ammonia from a fluid stream. The zinc hydroxide ammonia reaction can be reversed at higher temperatures or under vacuum to produce a wet ammonia gas stream, or with contact with a weak acid; a metal loaded ion exchange medium can also be used for ammonia recovery with reversal of the reaction by the use of a weak acid. Definitions for various terms used herein are provided below.

Definitions

As used herein the following terms have meanings as follows:

Activated metal hydroxide—a metal hydroxide treated by contacting with ammonia or other activating agent or during the production of the metal hydroxide where the metal hydroxide has increased ammonia absorption capacity compared to the untreated metal hydroxide.

Weak acid—as used herein refers to an acid having a $pK_a$ between about 3 to about 7.5 and preferably between 3 to 6, that is nonchelating with respect to the metal ions to be regenerated in the exchange medium. Typical weak acids useful in the invention include weak organic acids such as acetic acid, formic acid and the like, and weak inorganic acids such as nitrous acid and the like (see Table 6). The $pK_a$ ranges are important; because, it has been found that metal is stripped from the ionic exchange resins by use of regenerant acids having a low $pK_a$ such as below about 3 and very definitely below 2 and below 1.

Sorbent—as used herein includes polymeric materials and solid materials having a surface area able to bind ammonia. The term sorbent and its related terms of speech are used generally herein to include both chemical and physical absorbents and adsorbents.

Metal loaded media—as used herein includes metal loaded ion exchange materials, chelating materials, zeolites, and organic or inorganic materials. The important characteristic for these metal loaded media is that they be capable of reversibly binding ammonia. The metal should be firmly bound to the substrate material so as not to substantially unbind during the conditions of use. The metal loaded media should bind ammonia on exposure to an ammonia containing fluid stream and give up the ammonia when exposed to a weak acid.

Pretreatment of the waste streams used in the invention is contemplated to the extent that solids, biological matter and the like are filtered out in pretreatment steps that are well known in the art of waste treatment (e.g. flocculation and settling tanks, biological treatment tanks). The pretreatment steps are useful in removing materials that would have a tendency to clog, coat or otherwise interfere with the ammonia recovery of the invention.

Referring now to FIG. 1, which is a simplified schematic of the reversible chemisorption apparatus and process 100. An aqueous stream 101 containing ammonia contacts a sorbent stream 103 in an absorber/reactor 105. Ammonia in the liquid is chemically bound to the sorbent (such as zinc oxide/zinc hydroxide) and the combined stream 107 flows to a solid-liquid separator 109. The water stream 111 with significantly reduced ammonia concentration, can be reused or discharged. A stream 113 containing the solid sorbent and ammonia complex can be heated in a heat exchanger 115 to thermally reverse the chemisorption as the heated stream 117. The heated stream 117 can be flashed in flash tank 119 to produce a concentrated vapor ammonia stream 121 that may be used for chemical value or as a fertilizer. The regenerated sorbent stream 123 may be recycled by means of a pump 125 or other conveyance. The recycle stream 127 may be cooled in a heat exchanger 129 before being returned to the absorber/reactor 105.

Figure 2:
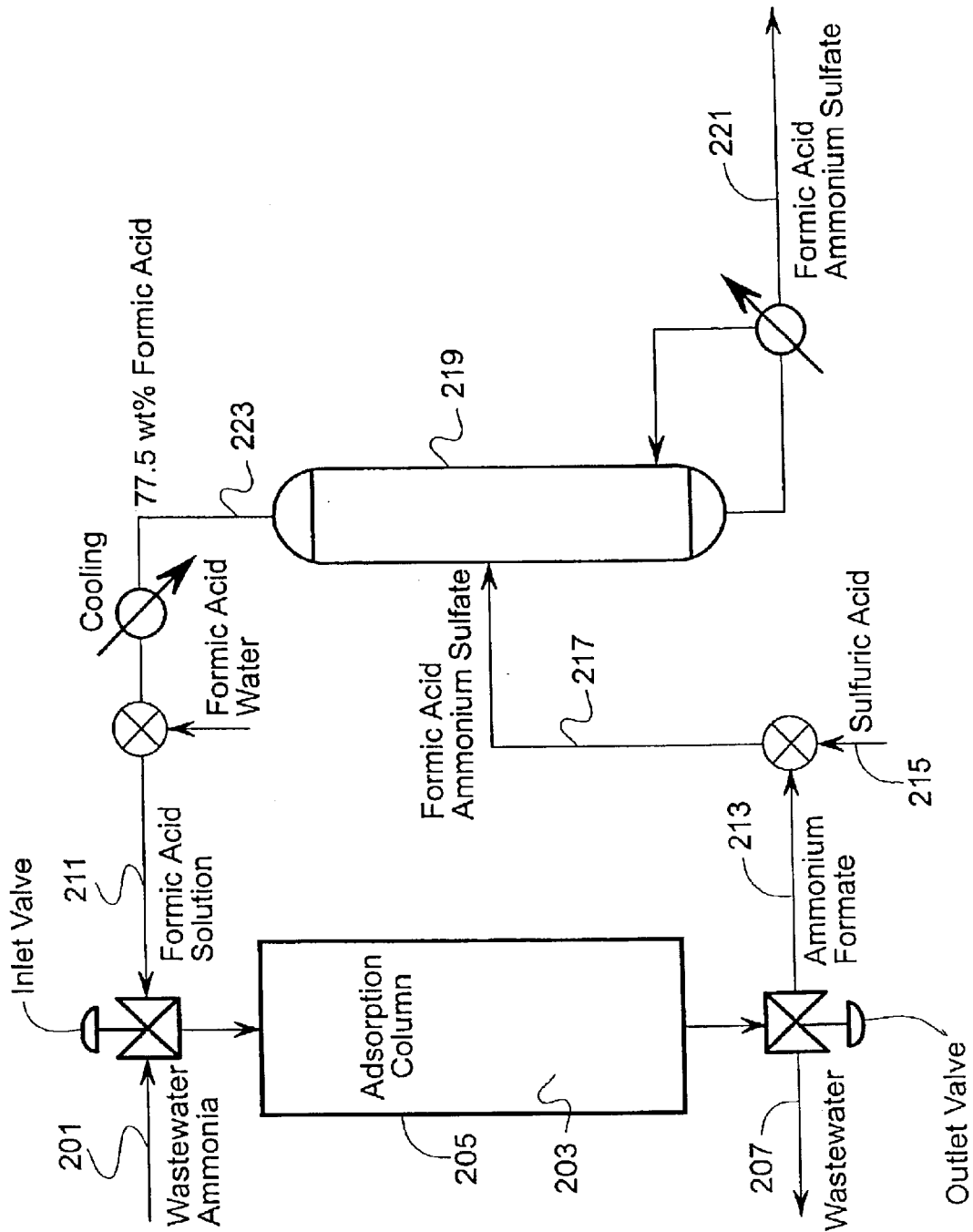
FIG. 2 is a schematic drawing of a reversible chemisorption apparatus and process for ammonia removal using ligand exchange adsorption with formic acid regeneration and partial formic acid recovery.

Referring to FIG. 2, which illustrates an alternate embodiment for the apparatus 200 and method of applying the reversible chemisorption process. An aqueous stream 201 containing ammonia contacts a sorbent 203 in a sorption column 205. The water stream 207, with significantly reduced ammonia concentration, can be reused or discharged. Multiple sorption columns can be used in parallel or series. The sorption columns may be packed, fluidized, trayed, and the like. Chemical regeneration of the sorbent 203 may be achieved by periodically stripping the column with a weak nonchelating acid solution 211 such as formic, nitrous, or acetic acid. This removes the ammonia from the sorbent as an ammonium salt stream 213. Some applications may benefit from recycling the weak acid, which can be accomplished by adding an acid stream 215 (for example, nitric acid or sulfuric acid) and distilling the mixture 217 in a distillation column 219. The resulting ammonium salt solution can be discharged 221 while the recovered weak acid 223 can be condensed, cooled and recycled to the adsorption column during the next regeneration/strip sequence.

Figure 3:
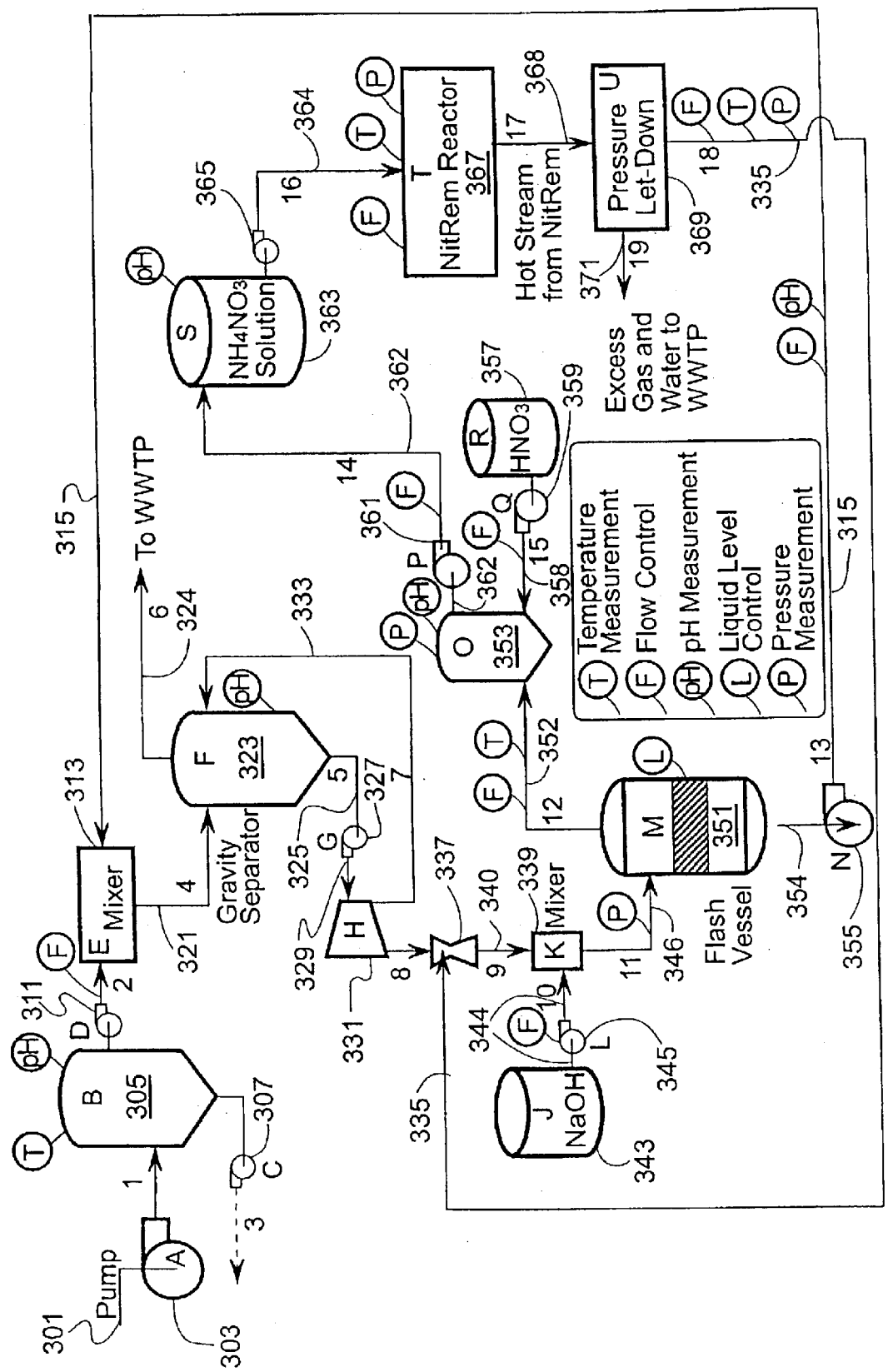
FIG. 3 is a schematic drawing of a combination of a zinc hydroxide-ammonia recovery process and a NitRem process.

Referring now to FIG. 3, there is shown a schematic diagram of on embodiment of the overall process using extraction with Zn(OH) and a nitrogen reactor. Ammonia is not recovered in this process but is converted to nitrogen. An ammonia containing liquid stream 301 from a water treatment plant obtained from the processing of a municipal sewage or an industrial effluent digested sludge is pumped with pump 303 into a settling tank 305. Excess settleable solids may collect in the bottom tank 305 and be sent back to the water treatment plant (not shown) by pump 307. The remaining liquid is pumped via pump 311 into mixer 313 where it is mixed with a zinc and sodium hydroxide slurry from line 315. The ammonia in the liquid absorbs onto the zinc hydroxide. The materials are sent to settling tank 323 via line 321. The combined ammonia/zinc hydroxide materials precipitate and settle to the bottom of settling tank 323. The sodium hydroxide is present in a concentration to adjust the pH of the liquid to a preferred level of about pH 7 to 9. Zinc hydroxide is only sparingly soluble at this pH and only an estimated 0.6 ppm is lost to the deammoniated stream 325 that is returned to the water treatment plant. The ion from the sodium hydroxide remains soluble and exits the process with stream 325. The ammoniated zinc hydroxide settles to the bottom of tank 323 and thickens by gravitational forces. The stream low in free ammonia exits the process via line 324.

The thickened—ammoniated zinc hydroxide flows from tank 323 and is pumped via pump 327 and lines 329 to decant centrifuge 331. The centrate from the centrifuge 331 is recycled back to tank 323 via line 333. The bulk of the ammoniated zinc hydroxide solids from centrifuge 331 are pressurized and heated via mixture with stream 335 in eductor 337 and the mix is sent to mixer 339 via line 340. Fresh NaOH solution is added in mixer 341 and blended from tank 343 vial pump 345 and lines 344. The temperature and pH of the stream in the output line 346 of mixer 341 are sufficiently high to cause substantially complete ammonia desorption and partial dissolution of the zinc hydroxide. The ammonia-containing stream is sent to flash vessel 351 via line 346 where it is desorbed and flashed in vessel 351. The ammonia travels with steam from flash vessel 351 via line 352 to absorber 353 where $HNO_3$ is added to form ammonium nitrate ($NH_4NO_3$). The ammonia free-zinc and sodium hydroxide stream is sent to pump 355 via line 354 and then to mixer 313 via line 315. The partially dissolved zinc hydroxide re-precipitates upon the pH change in mixer 313 and separator 323. The action of partially dissolving and re-precipitating the zinc hydroxide renews the crystal surfaces and maintains the ammonia absorbing activity of the sorbent material. The distribution of the zinc hydroxide in soluble form also increases mass transfer kinetics for the absorption of ammonia in mixer 331 and settling tank 323.

Nitric acid stored in tank 357 is pumped to absorber 353 via pump 359 and lines 358 where formation of $NH_4NO_3$ takes place (it reacts with the free ammonia to form an aqueous solution of concentrated ammonium). The nitric acid is added to obtain a pH below 3 in the absorber 353 and to obtain an optimum molar ratio of nitric acid to ammonia of about 1.3 in the following reactions in NitRem reactor 367. Ammonia vapor from line 352 is immediately and quantitatively absorbed into the low pH solution in absorber 353. The output of absorber 353 is pumped to tank 363 via pump 361 and lines 362. The $NH_4NO_3$ solution is stored in tank 363 and pumped to the NitRem reactor 367 by pump 365 and lines 364 for further reaction. Some cooling may be supplied at 363 or reactor 367 and/or line 335 as needed to dissipate both the heats of reaction and the latent heat of condensation of both the ammonia and water. Since the stream in line 152 is a vapor above a high pH liquid, it contains substantially no HCl, no solids, and no mineral salts of any kind. At the worst it will contain some hydrocarbon compounds and possibly some sulfur compounds. All of the materials that are volatile at the conditions in flash vessel 351 are converted into very soluble non-odorous materials in a hydrothermal NitRem reaction in 367. Hydrocarbons are converted to water and carbon dioxide, sulfur is converted to sulfuric acid, and the nitrogen compounds are converted to nitrogen gas.

The hydrothermal reactor system is described in the following U.S. Pat. Nos.: 5,221,486 and 5,433,868 to Fassbender. The reactor system consists of only a pump, a high pressure reactor and controls. Due to the high concentration of ammonium nitrate and the high exothermic reaction, no heat exchangers are required to maintain the reaction. Cold solution from line 364 is pumped directly into the hot reactor 367 and the energy of reaction is sufficient to maintain the reactor 367 at hydrothermal temperatures. Processed water and nitrogen gas are removed from the reactor 367 at full reactor temperature via line 368 and sent to a pressure let-down system 369. The pressure is relieved to about 500 psi (350,000 kg/m$^2$) where large quantities of nitrogen gas and steam are removed. A portion of the high temperature liquid is used in stream 335 to power eductor 337 and the excess gas and water may be returned to the waste water treatment plant via line 371 or otherwise disposed of.

Efficiencies in the process are obtained by the following:
(1) the zinc regeneration step requires heat and the NitRem reactor can supply that heat while simultaneously disposing of the ammonia;
(2) the zinc regeneration step generates ammonia vapor, which must be recovered in a condensed form. Nitric acid absorbs this vapor with extremely high efficiency and generates a solution optimal for processing with a NitRem reactor;
(3) the ammonium nitrate and nitric acid stream contains substantially no mineral cations making processing in the supercritical regime vastly simpler; the high concentration and energy content of the ammonium nitrate stream allows for simple reactor design and minimizes or eliminates the need for high pressure heat exchangers; and (4) the pH swing using sodium hydroxide renews the surface of the zinc hydroxide crystals and enhances the kinetics and mass transfer in absorbing ammonia.

EXAMPLE 1A

This example demonstrates that the ammonia adsorption is dependent both upon the type of resin to which the ammonia binding metal is adsorbed and the process by which the metal is adsorbed to the resin. Four resins were examined. Dowex™ 50WX2-400, Dowex™ 50WX2-100, and Dowex™ 50WX8-400 are all strong acid ion exchange resins with a microporous styrene/DVB matrix structure with sulfonic functional groups, produced by The Dow Chemical Company (Midland, Mich.). Dowex™ 50WX2-400 has 200–400 mesh particle sizes with 2% crosslinking. Dowex™ 50WX2-100 has 50–100 mesh particle sizes with 2% crosslinking. Dowex™ 50WX8-400 has 200–400 mesh particle sizes with 8% crosslinking. The Duolite™ ES-467 resin is a weakly acidic ion exchange resin with a macroporous polystyrene/DVB matrix structure with aminophosphonic functional groups and particle sizes of 16–50 mesh. Before loading with Zn, all four resins were washed three or four times with deionized water.

In a first case, washed Dowex™ 50WX2-400 resin was subsequently loaded with Zn by diluting 8 ml of resin to 50 ml using deionized water. This slurry was kept mixing throughout the rest of the loading procedure using a small magnetic stir bar and a magnetic stirrer. A total of 0.4269 g of $ZnSO_4$ was added to the slurry to provide Zn, along with 0.300 ml of glacial acetic acid to provide buffering capacity between pH's 4 and 5. The pH of this solution was then adjusted to 1.2 using 850 ml of 1 M $H_2SO_4$. The slurry was held at this pH for 15 minutes, before using 8.7 ml of 1 M NaOH to raise the pH to between 4 and 5. The slurry was held at this pH for two hours, before increasing the pH to 6.6 using 3 ml of 1 M NaOH added in 0.5 ml increments. The resin removed from the stirred beaker and washed four times with deionized water before diluting to 100 ml using deionized water for storage.

In a second case, washed Dowex™ 50WX2-400 resin was loaded with Zn by diluting 8 ml of resin to 50 ml using deionized water. This slurry was kept mixing throughout the rest of the loading procedure using a small magnetic stir bar and a magnetic stirrer. A total of 0.2148 g of ZnO was added to the slurry to provide a source of Zn. The solution was then pH adjusted to 1.2 using 4.140 ml of 1 M HCl. The pH was held at 1.2 for 15 minutes before gradually raising the pH to 7.1 by slowly adding 4.6 ml of 1 M NaOH. The resin was then washed four times with deionized water before diluting to 100 ml using deionized water in preparation for storage.

In a third case, washed Dowex™ 50WX2-100 resin was loaded with Zn by diluting 16 ml of resin to 100 ml using deionized water. This slurry was kept mixing throughout the rest of the loading procedure using a small magnetic stir bar and a magnetic stirrer. A total of 0.4263 g of $ZnSO_4$ was added to the slurry to provide a source of Zn along with 0.6 ml of acetic acid to provide buffering capacity between pH 4 and 5. The pH of this slurry was then adjusted to 1.2 using 1.870 ml of 1 M $H_2SO_4$. The pH was then held at 1.2 for 15 minutes before adjusting the pH to 4.2 using 16.5 ml of 1 M NaOH. The slurry was then held between pH 4 and 5 for two hours before raising the pH to 6.7 using 7 ml of 1 M NaOH. The resin was then washed four times with deionized water before diluting to 100 ml using deionized water in preparation for storage.

In a fourth case, washed Dowex™ 50WX8-400 resin was loaded with Zn by diluting 16 ml of resin to 100 ml using deionized water. This slurry was kept mixing throughout the rest of the loading procedure using a small magnetic stir bar and a magnetic stirrer. A total of 1.2087 g of $ZnSO_4$ was added to the slurry to provide a source of Zn along with 0.6 ml of acetic acid to provide buffering capacity between pH 4 and 5. The pH of this slurry was not further adjusted since it had already been reduced to 1.0. During this time $Zn^{2+}$ is loading and displacing $H^+$ from $RSO^3H$. The slurry was held at pH 1.0 for 15 minutes before adjusting it to 4.4 using 34 ml of 1 M NaOH. The slurry was then held between pH 4 and 5 for two hours before raising the pH to 7.0 using 6.3 ml of 1 M NaOH. The resin was then washed four times with deionized water before diluting to 100 ml using deionized water in preparation for storage.

In a fifth case, washed Duolite ES-467 was loaded with Zn by diluting 25 ml of resin to 200 ml using deionized water. This slurry was kept mixing throughout the rest of the loading procedure using a small magnetic stir bar and a magnetic stirrer. A total of 2.8573 g of $ZnSO_4$ was added to the slurry to provide a source of Zn along with 0.6 ml of acetic acid to provide buffering capacity between pH 4 and 5. The pH of this slurry was then adjusted to 1.2 using 23 ml of 1 M $H_2SO_4$. The pH was then held at 1.2 for 15 minutes before adjusting the pH to 4.4 using 45 ml of 1 M NaOH. After 45 minutes, the pH had dropped to 4.15 so an additional 3 ml of 1 M NaOH was added to raise the pH to 4.4. The slurry was then held between pH 4 and 5 for an additional 1 hour and 15 minutes before raising the pH to 7.0 using 10.5 ml of 1 M NaOH. The resin was then washed three times with deionized water before diluting to 125 ml using deionized water in preparation for storage.

After loading each resin with Zn, the ammonia binding capacity of the resin at pH 8.0 was measured by diluting 3 ml of each resin to 85 ml using deionized water. To this slurry 15 ml of 1000 ppm $NH_3$ solution prepared from $NH_4Cl$ was added to the slurry to bring the volume to 100 ml. The slurry was then kept mixing using a magnetic stir bar and a magnetic stirrer while the pH was adjusted to 8.0 using 1 M NaOH. This required 62 and 70 µl of 1 M NaOH for the two trials using the resin prepared in Case 1; 150 and 146 µl of 1 M NaOH for the two trials using the resin prepared in Case 2; 30 and 20 µl of 1 M NaOH for the two trials using the resin prepared in Case 3; 20 and 10 µl of 1 M NaOH for the two trials using the resin prepared in Case 5; and 490 µl of 1 M NaOH for the trial using the resin prepared in Case 5. The slurries were kept mixing for 10 minutes, before centrifuging for 10 minutes to remove the resin from the supernatant. A total of 50 ml of supernatant was then combined with 1 ml of 5 M NaOH to raise the pH above 12 converting ammonium ion to dissolved ammonia. Each supernatant's ammonia concentration was then measured using an Orion ammonia ion specific electrode. The results are summarized in Table 1.

In a sixth case, the ammonia binding capacity of ZnO was measured by adding 0.2161 g of ZnO to 85 ml of deionized water. To this slurry 15 ml of 1000 ppm $NH_3$ solution prepared from $NH_4Cl$ was added to the slurry to bring the volume to 100 ml. The slurry was then kept mixing using a magnetic stir bar and a magnetic stirrer while the pH was adjusted to 8.0 using 1 M NaOH. This required 46 µl of 1 M NaOH. The slurry was kept mixing for 20 minutes, before centrifuging for 10 minutes to remove the ZnO from the supernatant. A total of 50 ml of supernatant was then combined with 1 ml of 5 M NaOH to raise the pH above 12 converting ammonium ion to dissolved ammonia. The supernatant's ammonia concentration was then measured using an Orion ammonia ion specific electrode. The results are summarized in Table 1.

TABLE 1

Comparison of Ammonia Adsorption for Various Resins and Zinc Loading Techniques [a,b]

| Resin | Loading Procedure | Zinc Source | Final NH$_3$ content (ppm) | Fraction NH$_3$ Adsorbed (%) |
|---|---|---|---|---|
| Dowex ™ 50WX2-400 | Case 1 | ZnSO$_4$ | 65.6 | 56 |
|  |  |  | 64.8 | 57 |
| Dowex ™ 50WX2-400 | Case 2 | ZnO | 89.0 | 41 |
|  |  |  | 87.9 | 41 |
| Dowex ™ 50WX2-100 | Case 3 | ZnSO$_4$ | 52.5 | 65 |
|  |  |  | 54.3 | 64 |
| Dowex ™ 50WX8-400 | Case 4 | ZnSO$_4$ | 22.2 | 85 |
|  |  |  | 22.6 | 85 |
| Duolite ™ ES-467 | Case 5 | ZnSO$_4$ | 96.0 | 36 |
| None | Case 6 | ZnO | 151 | 0 |

[a] pH = 8.0
[b] initial NH$_3$ content was 150 ppm

A comparison of the results from Cases 1 and 2 show that the procedure used to load the Zn onto the resin can have a significant effect on the subsequent ammonia adsorption properties of the resin. It is thought that the chloride ion provided by the HCl used in Case 2 bound to the Zn reducing the sites available for ammonia binding compared to that for the identical resin in Case 1 prepared with H$_2$SO$_4$. The results indicate that the type of zinc salt that is used to load the resin influences the resin's future ammonia adsorption capability and zinc salts with counter ions with minimal affinities for zinc are preferred. A comparison of the results for Cases 1 and 3 shows that varying the particle size of the resin also affects the ammonia binding capacity. Comparison of Cases 1 and 4 shows that the crosslinking has a dramatic effect on the zinc loaded resin's ammonia binding capacity. This is most likely due to the increased amount of zinc, which the resin in Case 4 can bind compared to Case 1. The resin in Case 5 had a lower capacity for ammonia than either Case 1 or 4 even though its theoretical zinc binding capacity was somewhere between that for those resins. It is thought that the zinc is bound much more tightly to amino phosphonate chelating the functional groups present in Case 5 than any of the other cases, reducing the zinc's capacity for ammonia binding by decreasing the potential for Zn losses from the resin. The results in Case 6 showed that unmodified ZnO had no detectable activity as an ammonia sorbent.

Although the Zn was loaded to the resin in a batch slurry mode in all five cases outlined here, it is not the only means of loading the Zn on the resin. All that is required for metal loading on the resin is the contacting of a solution of soluble metal salt with the resin in a solution with a high enough pH to avoid metal stripping from the resin by H$^+$ or by supplying enough metal ions to outcompete the hydrogen ions at the sorbent/resin loading site. This would include loading processes such as passing ZnSO$_4$ or other soluble zinc salts across a packed bed or tower of the resin to be loaded. The preferred zinc salts are those that have counter ions with a minimum of affinity for the zinc such as ZnSO$_4$.

EXAMPLE 2A

This example demonstrates that ammonia may be absorbed to a metal hydroxide adsorbent, and that the degree is dependent on the conditions under which the hydroxide is formed. Three different contacting schemes were examined. In the first case, the insoluble Zn(OH)$_2$ precipitate was formed in the presence of ammonia. In the second case, the insoluble Zn(OH)$_2$ precipitate was formed in solution and then the ammonia was added to the solution. In the third case, the insoluble Zn(OH)$_2$ precipitate was formed, recovered by filtration, washed, and then added to an ammonia solution.

In a first case, 100 ml of 100 ppm NH$_3$ was prepared by adding 10 ml of 1000 ppm NH$_3$ stock solution prepared from NH$_4$Cl to 90 ml of deionized water. This solution was kept mixing using a magnetic stir bar and a magnetic stirrer while 0.7990 g of ZnCl$_2$ was added. Upon the addition of the ZnCl$_2$, the slight formation of Zn(OH)$_2$ was observed. The pH of the solution was then raised to 9.3 using 9.162 ml of 1 M NaOH. As the pH was raised the amount of Zn(OH)$_2$ was visually observed to increase. Once pH 9.3 was reached, the solution was allowed to mix covered for 30 minutes before the ammonia concentration was measured. The solution was then centrifuged for 10 minutes. 50 ml of the supernatant was combined with 1 ml of 5 M NaOH to raise the pH above 12 converting nearly all of the ammonium ion to ammonia, which was then measured using an Orion ammonia ion specific electrode.

In a second case, 0.8063 g of ZnCl$_2$ was added to 90 ml of deionized water while stirring with a magnetic stir bar and a magnetic stirrer. Once again some slight precipitate formation was noted. The amount of precipitate was greatly increased when the pH was adjusted to 9.2 using 8.532 ml of 1 M NaOH. To this slurry, 10 ml of 1000 ppm NH$_3$ stock solution prepared from NH$_4$Cl was added. The solution's pH was then adjusted to 9.3 using 0.345 ml of 1 M NaOH. The solution was held mixing for 30 minutes before measuring the ammonia concentration. The slurry was then centrifuged for 10 minutes. A total of 50 ml of the obtained supernatant was then combined with 1 ml of 5 M NaOH to raise the pH above 12 converting nearly all of the ammonium ion to ammonia which was then measured using an Orion ammonia ion specific electrode.

In a third case, Zn(OH)$_2$ precipitate was prepared by dissolving 14.7 g of ZnCl$_2$ in 50 ml of deionized water and then adjusting the pH to 11.0 using 5 M NaOH. This slurry was then filtered using a #2 Whatman filter in a Buchner funnel (tare wt.=233.0 g). The filter cake was then rinsed three times using deionized water. The final weight of the Buchner funnel and the filter cake was found to be 256.6 g yielding 23.6 g of Zn(OH)$_2$ precipitate. 1.285 g of this precipitate was then added to 100 ml of 100 ppm NH$_3$ solution prepared by adding 10 ml of 1000 ppm NH$_3$ stock solution prepared from NH$_4$Cl to 90 ml of deionized water. This slurry was pH adjusted to pH 9.4 by adding 0.343 ml of 1 M NaOH and held 15 minutes before measuring the ammonia concentration. The slurry was then centrifuged for 10 minutes. A total of 50 ml of the obtained supernatant was then combined with 1 ml of 5 M NaOH to raise the pH above 12 converting nearly all of the ammonium ion to ammonia which was then measured using an Orion ammonia ion specific electrode.

The results from these three experiments are summarized in Table 2. From this table it can be seen that the Zn(OH)$_2$ had the greatest capacity for ammonia when it was formed in the presence of the ammonia as in Case 1. This capacity was somewhat reduced when the Zn(OH)$_2$ was prepared before the addition of the ammonia to the solution as in Case 2. Though the exact cause of this phenomenon is not known, it is suspected that the number of hydrated Zn groups on the particle surfaces directly exposed to the NH$_3$ is reduced in Case 2 compared to Case 1. The least ammonia adsorption was observed in the case where the Zn(OH)2 was prepared, flitered and washed before addition to the ammonia solution as in Case 3. Once again the exact cause of the loss of ammonia binding capacity has not been determined though a number of hypotheses have been advanced including possible differences in precipitate surface area, particle size, formation of a carbonate barrier layer, or the $Zn(OH)_2$ being converted to a different one of its six known morphological structures.

TABLE 2

Effect of Various Contacting Schemes on Ammonia Adsorption by $Zn(OH)_2$

| Contacting Procedure | Precipitate Formation | Fraction of $NH_3$ adsorbed (%) |
|---|---|---|
| Case 1 | Formed in presence of $NH_3$. | 12.3 |
| Case 2 | Formed before addition of $NH_3$. | 9.6 |
| Case 3 | Formed, filtered, and washed before adding to $NH_3$ solution. | 4.4 |

Although in each of these three cases, the $Zn(OH)_2$ was prepared from $ZnCl_2$ salt, this should not be taken as the only method available for forming the $Zn(OH)_2$ precipitate. All that is required for precipitate formation is the dissolution of a zinc salt in a concentration exceeding $5 \times 10^{-5}$ M followed by pH adjustment to a pH greater than 7 and less than 13 with a preferred range of 9 to 11. In this laboratory $Zn(OH)_2$ has also been prepared using $ZnSO_4$ and soluble $ZnCl_2$ solutions prepared by reducing the pH of ZnO slurries to pH's of less than 2 using HCl. It is believed that as with the zinc loaded resins, different ammonia binding capacities will be observed for $Zn(OH)_2$ precipitates formed from different salts. The use of a batch contacting system to contact the precipitate with the $NH_3$ should not be taken to exclude other contacting systems including, but not limited to packed beds. All that is required for adsorption is intimate contact between the precipitate and the ammonia containing solution.

EXAMPLE 3A

In this example the dependence of the ammonia adsorption capacity of zinc loaded resin as a function of the ammonia is demonstrated by preparing an adsorption isotherm. The adsorption isotherm was determined by combining a small amount of zinc loaded Dowex™ 50WX2-400 resin with varying strength ammonia solutions at pH 8.0 and room temperature.

The Dowex™ 50WX2-400 resin was prepared by washing it three times with deionized water. The Zn was loaded on the resin by diluting 20 ml of washed resin to 100 ml using deionized water and adding 0.3660 g of ZnO, while mixing using a magnetic stir bar and a magnetic stirrer. The pH of this solution was then reduced to less than 1.5 by adding 12 M HCl. At this pH, no insoluble ZnO was observed. The solution was held at this pH for 30 minutes, before increasing the pH to greater than 7.0 using 0.1 M NaOH. The zinc loaded resin was then rinsed three times with deionized water. After washing the resin was diluted to a total volume of 100 ml for storage.

The adsorption isotherm was generated by diluting three ml of zinc loaded resin to 90 ml using deionized water. Varying amounts of 1000 ppm $NH_3$ stock solution prepared from $NH_4Cl$ were then added to the slurry and the pH was adjusted to 8.0 using 1 M NaOH. The solution was then mixed for 15 minutes before centrifuging for 5 minutes. A total of 50 ml of the obtained supernatant was combined with 1 ml of 5 M NaOH to raise the pH to above 12 converting nearly all of the ammonium ion to ammonia which was then detected using an Orion ammonia ion specific electrode. The amounts of 1000 ppm $NH_3$ stock solution and 1 M NaOH added to each solution and the final $NH_3$ concentration achieved are summarized in Table 3.

TABLE 3

Results of Adsorption Isotherm Experiments.

| 1000 ppm $NH_3$ Stock Solution Added (ml) | 1 M NaOH Added (ml) | Total System Volume (ml) | Final $NH_3$ Concentration (ppm) |
|---|---|---|---|
| 8 | 0.517 | 98.5 | 24.4 |
| 10 | 0.404 | 100.4 | 36.3 |
| 12 | 0.526 | 102.5 | 44.9 |
| 14 | 0.691 | 104.7 | 53.7 |
| 18 | 0.707 | 108.7 | 73.0 |
| 25 | 0.803 | 115.8 | 113.9 |

Figure 4:
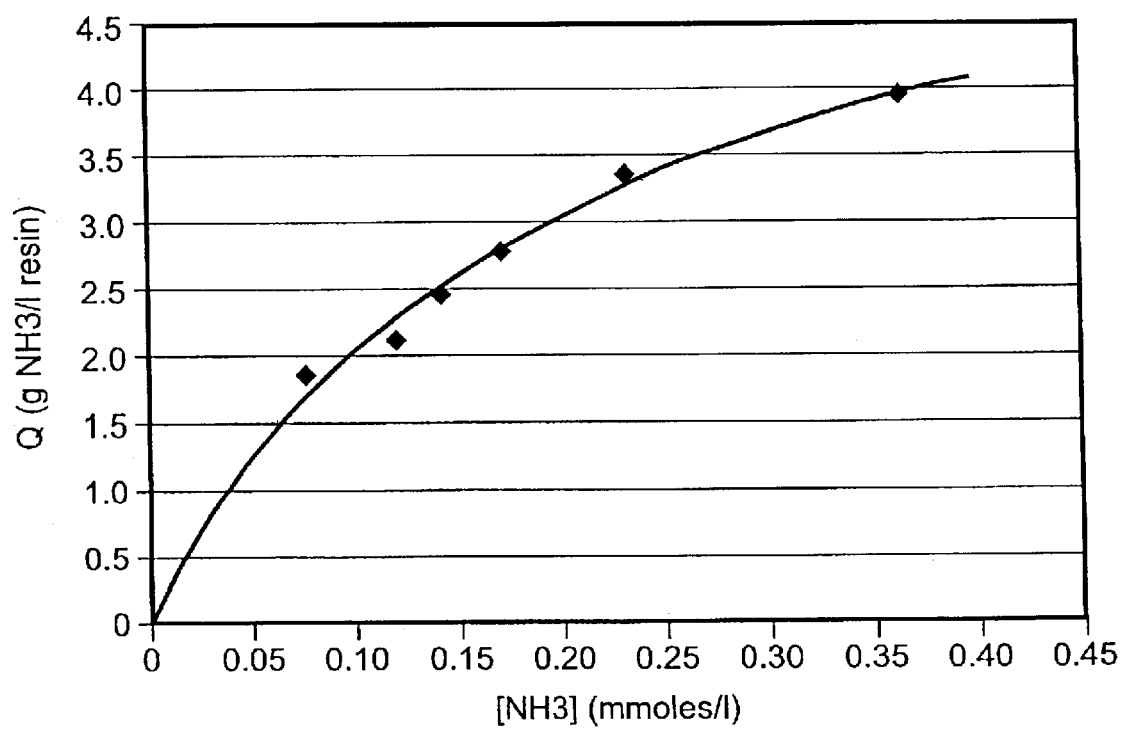
FIG. 4 is a fitting of a calculated Langmuir isotherm to measured data for the adsorption of ammonia to zinc loaded Dowex™ 50WX2-400 resin in batch experiments at pH=8.0, and at room temperature.

The total ammonia concentrations obtained above were converted to dissolved $NH_3$ concentrations using a rearranged ammonia/ammonium equilibrium expression:

$$[NH_3] = \frac{5.848 \times 10^{-10}[NH_3]_T}{10^{-pH} + 5.848 \times 10^{-10}}$$

where $[NH_3]$ is the concentration of dissolved ammonia at a given pH in mmoles/l and $[NH_3]_T$ is the total combined ammonia/ammonium concentration in the solution in mmoles/l. These dissolved $NH_3$ concentrations were plotted against the amount of ammonia absorbed per volume of resin and fit with a Langmuir isotherm. The resulting Langmuir isotherm expression was:

$$Q = \frac{6.35[NH_3]}{(0.218 + [NH_3])}$$

where Q is the specific ammonia adsorbance (grams of ammonia per liter resin) and $[NH_3]$ is the concentration of dissolved ammonia (mmoles/l). The Langmuir isotherm was fit to data as shown in FIG. 4. This expression implies that the maximum achievable ammonia concentration on this particular batch of resin is 6.35 NH3/l resin. This expression will vary depending on the metal loaded, resin used, past use, and loading procedure used among other factors. From this work it can be seen that the resin ammonia capacity will vary with the ammonia concentration in the contacting waste stream. Although this isotherm was determined using a batch contacting system, the results observed are not dependent upon the contacting system used.

EXAMPLE 4A

In this example the dependence of the ammonia adsorption capacity of $Zn(OH)_2$ formed from $ZnCl_2$ precipitated in the presence of ammonia as a function of the ammonia is demonstrated by preparing an adsorption isotherm. The adsorption isotherm was determined by combining a small amount $ZnCl_2$ with varying strength ammonia solutions at pH 9.5 and room temperature and adjusting the pH to 9.5 to form the $Zn(OH)_2$ precipitate.

Varying strength ammonia solutions were prepared by combining deionized water and 1000 ppm $NH_3$ stock solution prepared form $NH_4Cl$ in varying ratios. To this solution 4 ml of 200 g/l $ZnCl_2$ solution was added. The solution was stirred until the ZnCl₂ crystals had dissolved, and then the pH was adjusted to 9.5 using 1 M NaOH. The slurries were kept stirring using a magnetic stir bar and magnetic stirrer for 30 minutes, before centrifuging to remove the $Zn(OH)_2$ precipitate. A total of 50 ml of supernatant were then combined with 1 ml of 5 M NaOH to raise the pH above 12 before measuring the ammonia concentration using an Orion ammonia ion selective electrode. The amount of deionized water, NaOH, and $NH_3$ stock solution used is summarized in Table 4.

TABLE 4

Results of Adsorption Isotherm Experiments using $Zn(OH)_2$.

| Total Volume (ml) | 1 M NaOH Added (ml) | 1000 ppm $NH_3$ Added (ml) | Final [$NH_3$] Total (ppm) |
|---|---|---|---|
| 93.4 | 10.409 | 4 | 36.3 |
| 95.4 | 10.429 | 6 | 53.6 |
| 97.7 | 10.710 | 8 | 69 |
| 99.5 | 10.466 | 10 | 87.4 |
| 102.9 | 10.910 | 13 | 109.7 |
| 11.9 | 10.875 | 16 | 136 |
| 92.2 | 12.539 | 75 | 755 |

Figure 5:
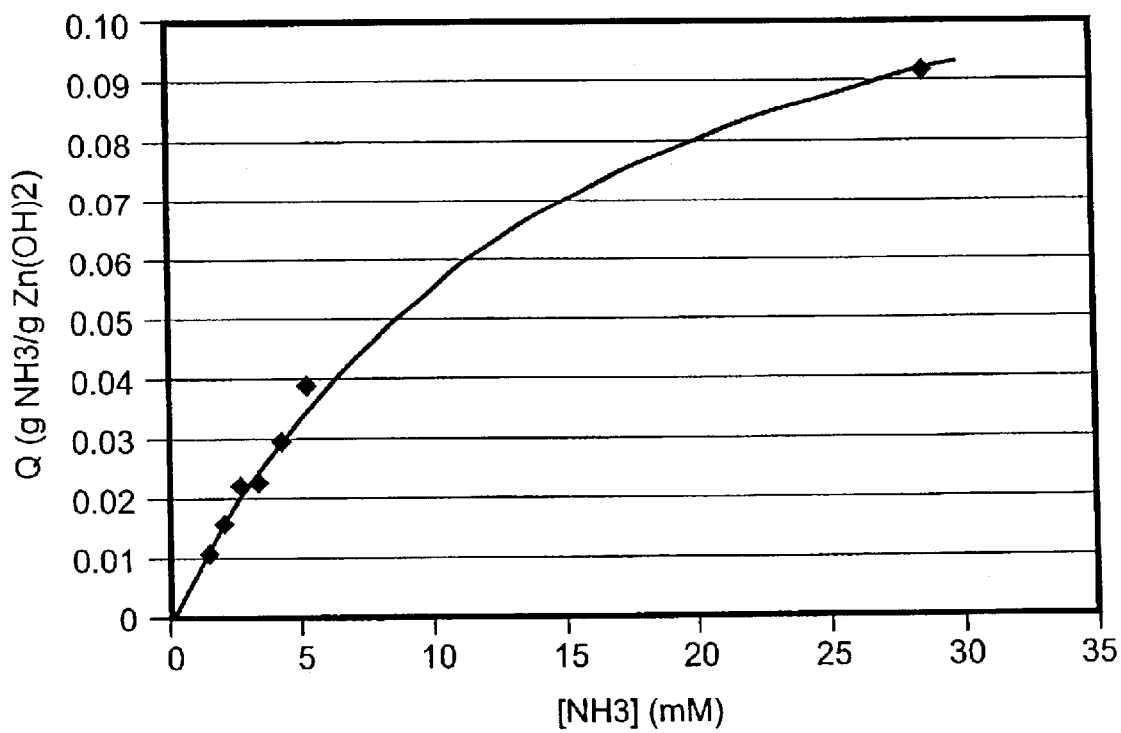
FIG. 5 is a fitting of a calculated Langmuir isotherm to measured data for the sorption of ammonia to $Zn(OH)_2$ resin in batch experiments at pH=9.5, and at room temperature.
Figure 6:
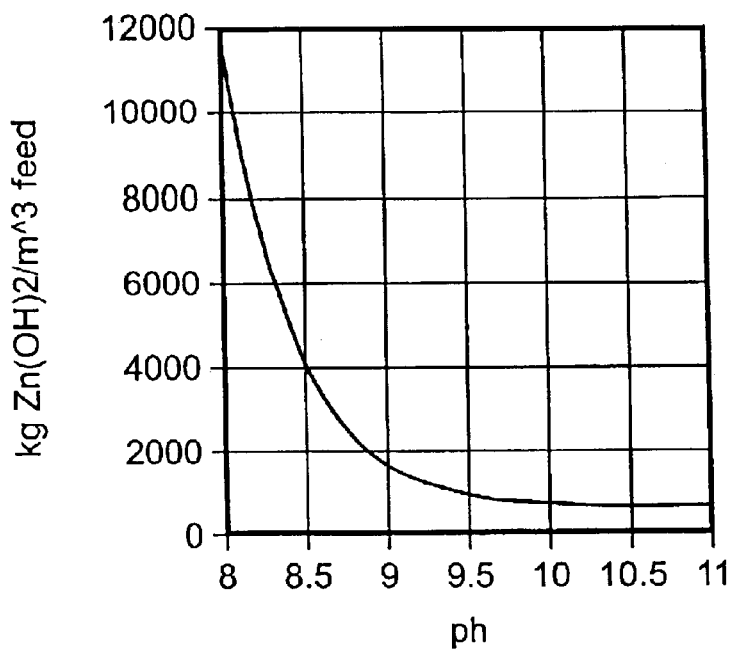
FIG. 6 is a calculated graph showing the amount of $Zn(OH)_2$ (precipitated in the presence of ammonia) required to reduce the ammonia concentration from 360 to 10 ppm in a single stage contactor. Calculated using the experimentally obtained sorption isotherm and a literature value of the ammonia dissociation constant.
Figure 7:
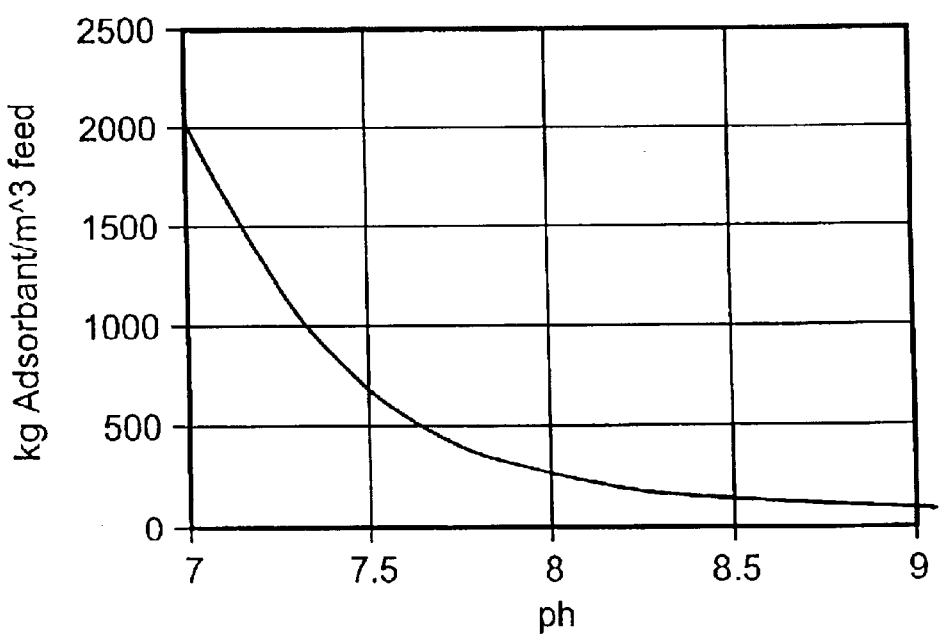
FIG. 7 is a calculated graph showing the amount of Zn-Dowex™ 50WX2-400 ion exchange resin required to reduce the ammonia concentration from 360 to 10 ppm in a single stage contactor. Calculated using the experimentally obtained sorption isotherm and a literature value of the ammonia dissociation constant.

The total ammonia concentrations obtained above were converted to dissolved $NH_3$ concentrations using a rearranged ammonia/ammonium equilibrium expression:

$$[NH_3] = \frac{5.848 \times 10^{-10} [NH_3]_T}{10^{-pH} + 5.848 \times 10^{-10}}$$

where [$NH_3$] is the concentration of dissolved ammonia at a given pH in mmole/l and [$NH_3$]$_T$ is the total combined ammonia/ammonium concentration in the solution in mmole/l. These dissolved $NH_3$ concentrations were plotted against the amount of ammonia absorbed per volume of resin and fit with a Langmuir isotherm a shown in FIG. 5. The resulting Langmuir isotherm expression was:

$$Q = \frac{0.143 [NH_3]}{(15.6 + [NH_3])}$$

where Q is the specific ammonia adsorbance (g $NH_3$/g $Zn(OH)_2$) and [$NH_3$] is the concentration of dissolved ammonia (mmole/l). This expression implies that the maximum achievable ammonia concentration on this particular batch of resin is 0.143 g $NH_3$/g $Zn(OH)_2$. This expression will vary depending on the particular metal hydroxide used, the salt from which the hydroxide is prepared, past use, and particle size among other factors. From this work it can be seen that the resin ammonia capacity will vary with the ammonia concentration in the contacting waste stream. Although this isotherm was determined using a batch contacting system, the results observed are not dependent upon the contacting system used.

EXAMPLE 5A

This example demonstrates the use of a weak organic acid to regenerate a metal loaded resin column after ammonia adsorption in a packed column configuration. In this example, a Zn loaded Dowex™ 50WX2-400 resin was packed into a 1 cm diameter column.

The Dowex™ 50WX2-400 ion exchange resin was washed three times with deionized water and then 15.5 ml of washed resin were slurried in deionized water and combined with 0.4562 g of ZnO. The pH of this solution was reduced to less than pH 1 using 5 M HCl at which all of the ZnO was solubilized. The mixture was held at this pH for 5 minutes, then raised slowly to pH 7.0 using 1 M NaOH. The resin was then washed with deionized water and diluted to a total volume of 100 ml using deionized water. A total of 6.0 ml of the zinc-loaded resin was then packed into a 1 cm diameter glass column by adding it in a deionized water slurry.

The column was loaded and regenerated using the following sequence. Deionized water was run through the column at 3 ml/min for five minutes. 300 ml of 100 ppm $NH_3$ solution adjusted to pH 8.0 using 1 M NaOH was passed through the column at 3 ml/min. 10 ml samples were collected. Deionized water was run through the column at 3 ml/min for five minutes. 100 ml of 20 wt. % formic acid was run through the column at 3 ml/min to regenerate the resin. 4 ml samples were collected. Deionized water was run through the column at 3 ml/min for five minutes.

Figure 10:
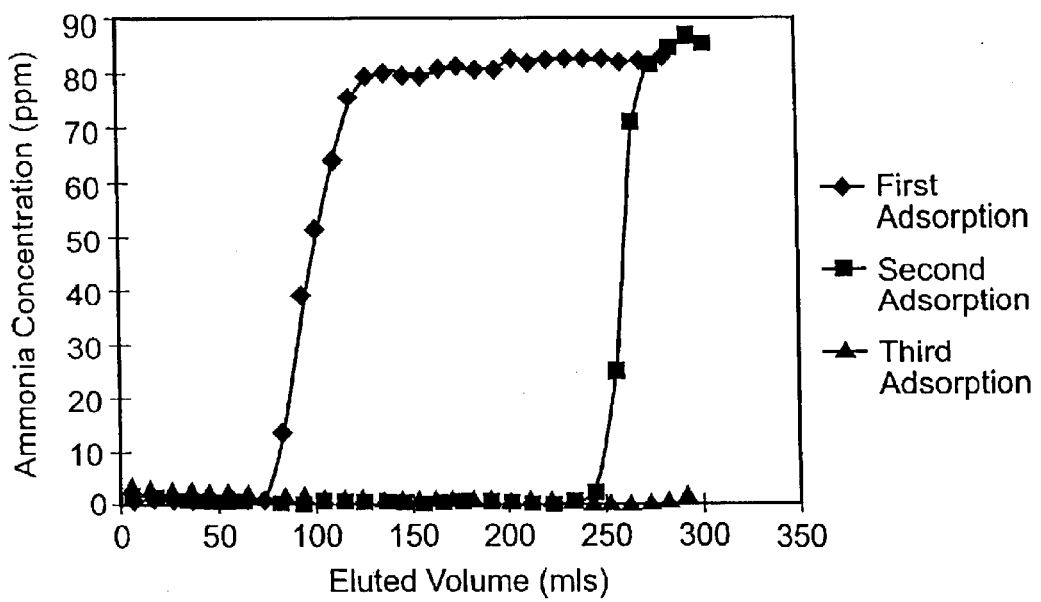
FIG. 10 is a graph showing ammonia breakthrough curves for pH 8.0, 100 ppm total ammonia, on 6 ml Zn-Dowex™ Ligand exchange resin for three desorption cycles.
Figure 11:
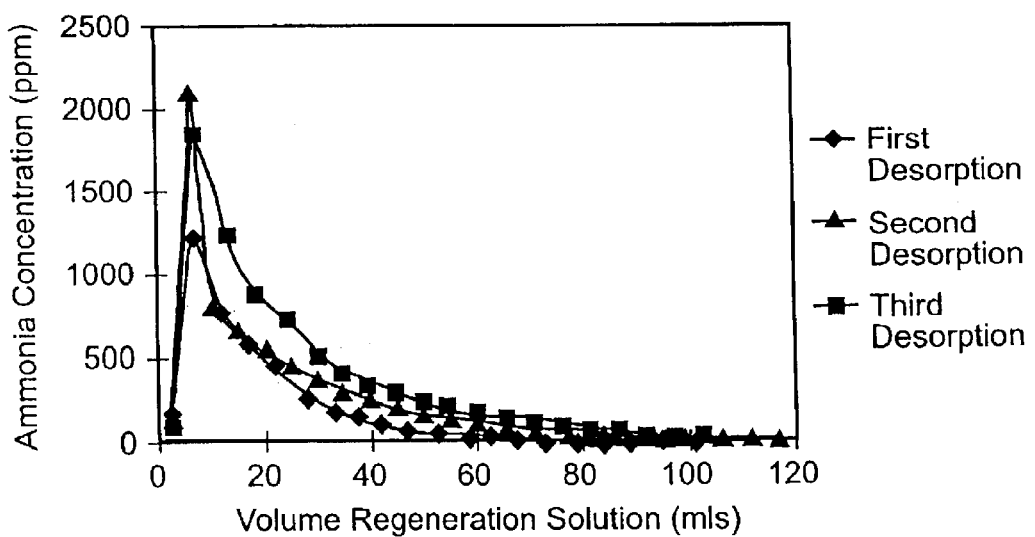
FIG. 11 is a graph showing the regeneration of an exchange column packed with Zn-Dowex Ligand 50WX2-400 ion exchange resin using 20% formic acid for three desorption cycles.

All of the samples were then analyzed for ammonia concentration by adding enough 5 M NaOH to raise the pH above 12 converting nearly all of the ammonium ion to ammonia which was measured using an Orion ammonia ion specific electrode. The results for three adsorption and desorption cycles are presented in FIGS. 10 and 11. It can be seen from these figures that the formic acid was very effective at regenerating the resins' ammonia binding capacity. The increased ammonia binding seen after regeneration may have been due to the removal of chloride ion from the resin bound Zn making more coordination sites available for ammonia binding. It can also be seen from FIG. 10 that effluent ammonia concentrations of less than 5 ppm are readily and repeatably obtained. The use of the zinc metal ion, Dowex™ 50WX-2 ion exchange resin, and formic acid regenerant in an adsorption column should not be viewed as stating that other metals, resins, acid regeneration solutions and contacting processes may not be used. All that is required to perform ammonia adsorption is the intimate contacting of the metal ion loaded resin or metal hydroxide with ammonia containing solutions. The resin may then be regenerated, by providing intimate contact between a non-chelating weak acid and the ammonia containing resin in a batch or continuous mode.

In another alternative embodiment the aqueous slurry of the present invention is used for the treatment of a gas stream containing ammonia gas. For example, a gas stream from an acrylonitrile process would be treated by contacting with the aqueous slurry of the present invention that contains a slurry of metal hydroxide (e.g. ZnOH) or metal loaded media (e.g. Zn attached to polymeric beads). The contacting would be in a device known in the art such as a scrubber. When the aqueous slurry containing the extracted ammonia exits the scrubber it would be treated to the recycle steps described herein.

In an alternative embodiment the regenerant weak acid (e.g. formic acid) can be regenerated using an electrochemical process that is well known in the art.

The present invention can be used alone or in combination with other methods such as air or steam stripping. In combination with other methods for example, air stripping can be used to reduce the ammonia concentration to say 50 to 100 ppm at which time ligand exchange adsorption would be used to reduce the concentration to low values such as less than 10 ppm to less than 1 ppm. It can also be used to remove ammonia from waste streams that can not be pH adjusted to a high pH, e.g. above a pH of 8 or 9.

Air stripping of a waste stream can be done using an air recycle stream, as exemplified by Saracco and Genon (1994). In this process, the pH of the waste stream is raised above 11 using lime to convert the ammonia to its gaseous form. The gaseous ammonia is then stripped from the waste stream using air. The ammonia is then removed from the air in the absorption column using a sulfuric acid solution to convert the gaseous ammonia to ammonium sulfate. The ammonium sulfate may then be disposed of, or recovered using a crystallize. The remaining ammonia remaining in the waste stream is then recovered using the materials, methods, or apparatus of the herein disclosed invention.

Resins useful for preparation of sorbents of the invention may be macroporous, a gel, hydrophilic, hydrophobic, or in the form of a solid porous sheet, hollow fiber membrane, or beads. Preferred resins typically include both the acid form and the salt form (e.g. $RSO_3H$ and $RSO_3$—$Na^+$) and typically include resins from the examples below. Examples of polymer backbones which are functional typically include for example polytrishydroxymethylacrylamide, polystyrene, polystyrene crosslinked with polystyrene divinyl benzene, and acrylic-divinyl benzene, agarose, cellulose, dextran, polymethacrylate, polystyrene-methacrylate or polystyrene divinyl benzene-methacrylate. Specific examples of typical useful resins include:

Acrylamide type with a polytrishydroxymethylacrylamide polymer backbone, such as the Trisacryl SP™ series resins that may be obtained from Pharmacia Biotech Inc., Piscataway, N.J.

Amino phosphonate type with a polystyrene polymer backbone, such as the Duolite™ ES 467 and C-467 resins that may be obtained from Rohm and Haas Company.

Aminodiacetate type with a polystyrene or polystyrene divinyl benzene polymer backbone, such as the Amberlite™ IRC 718 resins that may be obtained from Rohm and Haas Company, Philadelphia, Pa.

Carboxylate type with a acrylic-divinyl benzene, agarose, cellulose, dextran, polymethacrylate, polystyrene-methacrylate or polystyrene divinyl benzene-methacrylate polymer backbone, such as the IONAC™ CC, SR-10, Z-5 and CCP™ series resins that may be obtained from Sybron Chemicals, Birmingham, N.J.

Chelating tertiary amine type with a polystyrene divinyl benzene polymer backbone, such as the Dowex™ XFS 4195, 4196, 43084 resins that may be obtained from Dow Chemical Co., Midland, Mich.

Diphosphonate type with a polystyrene or polystyrene divinyl benzene polymer backbone, such as the AGMP-50™ resins that may be obtained from Bio-Rad Laboratories Inc., Richmond, Calif.

Diphosphonate, sulfonate type with a Styrene divinylbenzene polymer backbone, such as the Ionac™ SR-12 resins that may be obtained from Sybron Chemicals, Birmingham, N.J.

Phosphonate type with a cellulose or other polymer backbone, such as the PM™ cellulose resins that may be obtained from Pharmacia Biotech Inc., Piscataway, N.J.

Sulfonate type with an agarose, cellulose, dextran, polystyrene, or polystyrene divinyl benzene polymer backbone, such as the Dowex™ 50W, 50X, HCR and HGR series resins that may be obtained from Dow Chemical Co., Midland, Mich.

The resins listed and described above are also typically used with the second general embodiment that is described in detail below.

The metal hydroxide used in the first general embodiment of the invention may be macroporous, a gel, in the form of sheets, tubes, membranes, beads, and the like.

While zinc has been used throughout the examples for preparing metal hydroxides and for loading the metal loaded resins, other metals can also be used. Metals useful include Ag, Al, Ca, Ce, Cd, Co, Cr, Cu, Fe (II and III), Hg, Mg, Mn, Ni, Pd, Zn, Zr and the like. The metals may be used alone or in combination with one or more other metals. These metals are expected to have similar regeneration schemes as outlined above for zinc. Zinc is preferred because of its nontoxic character in relation to animals and humans.

Weak acids useful in the invention, both for regenerating the metal hydroxides and the metal loaded resins, typically include those listed in Table 6. The weak acids useful in the invention generally have a $pK_a$ between about 3 to about 7.5 and preferably between 3 to 6. Another important requirement is that the acid be nonchelating or does not form chelating products during regeneration with respect to the loaded metal ion under the conditions of regeneration so as not to strip the zinc metal from the resin. Both whey and AGS are useful in the invention because they are cheap sources of the weak acids that they contain.

Dimer, trimer, oligomeric, and polymeric nonchelating carboxylates are also expected to be effective and especially provide low volatility properties for better ammonia and weak acid separation. For example, acrylic acid homopolymer, maleic anhydride homopolymer, ethylene/acrylic acid copolymer, ethylene/methylacrylic acid copolymer are useful in this regard. The copolymer blend can be adjusted to minimize chelation by the polycarboxylic acid. (Chelation can also be reduced by using propylene in place of ethylene.) Typically a chain length of up to about 100 repeat units is preferred in order to obtain a water miscible carboxylic acid. Most preferred are oligomers having up to about 10 repeating units.

Water immiscible carboxylic acids are also expected to be useful with the invention. When water immiscible carboxylic acids are used, the metal containing sorbent must first be washed with an intermediate polarity solvent to remove water from the sorbent to prevent the carboxylic acid from precipitating on the sorbent, or by preventing access to the ammonia by poor wetting of the resin by the carboxylic acid, and thereby reducing or preventing its ability to strip ammonia from the resin. An example of such an intermediate solvent is an alcohol (e.g. methyl, ethyl, isopropyl, or butyl alcohol), or ketones (e.g. acetone, methyl ethyl ketone, etc.), etc. A water solubility of only a few percent is required for the solvent to be effective in removing water from the resin prior to elution of the ammonia by the carboxylic acid. Other appropriate solvents are known to those skilled in the art.

After washing the resin with the alcohol, a non-chelating water immiscible carboxylic acid stripping solution is contacted with the resin to remove ammonia from the sorbent. Thereafter, before reuse as a sorbent, the sorbent is again washed with alcohol or other appropriate solvent to remove any remaining stripping solution. The alcohol or other appropriate solvent is recovered by distillation after it has become sufficiently loaded with immiscible carboxylic acid, where upon the carboxylic acid is also recycled back to the stripping operation, or the ammonia recovery operation, part of the process. The ammonia loaded stripping solution is separated from the sorbent and can be treated to drive off the ammonia. One method of removing and recovering the ammonia is by heating, optionally with a vacuum to augment the process. Preferably the carboxylic acid is sufficiently high boiling that the ammonia is recovered. Distillation can also be used to recover any alcohol, or other wash solvent, and to remove entrained water, although these steps may not be critical other than to maintain fluid balance of alcohol, water, and water immiscible carboxylic acid volumes in the circuit.

A second means of recovering the ammonia from the water immiscible carboxylic acid (ammonium carboxylate) phase is to wash the phase with an aqueous solution, such as aqueous sulfuric acid or aqueous nitric acid, whereupon the water immiscible carboxylic acid phase is regenerated and recycled. The ammonia then in the form of an ammonium sulfate or ammonium nitrate solution respectively which can be isolated as product or sent to Nitrem(TM) processing to dinitrogen as already described. By using concentrated aqueous acid strip solutions, concentrated ammonium salt solutions can be produced making them of value for ammonia recovery and/or reducing the size and cost of processing equipment used for recovery or processing of the ammonia product.

Ammonia can also be released from the water immiscible carboxylic acid by treatment with alkaline material in solid or solution form using for example packed columns or stirred tanks. For example, caustic soda, soda ash, magnesium hydroxide, or lime could be used to provide this alkalinity. In such cases the freed neutral ammonia gas would be recovered, and the carboxylate salt regenerated by treatment with acid generating a waste salt solution or gypsum slurry.

A third means for recovering the ammonia from said water immiscible strip solution is to wash it with aqueous metal salt solution containing excess acid. For example the zinc sulfate/sulfuric acid solution previously described provide such a solution. The resultant ammonical solution then can be processed to a double salt as before.

Typically, the immiscible carboxylic acid should be branched and have eight or more carbon atoms (including the branches) so that it is a high boiling fluid, for example alpha-C12 alkyl succinates, versatic acids, neodecanoic acid, 2-ethylhexanoic acid, etc. Straight chain carboxylic acids of eight or more carbon atoms are also useful if dissolved in an appropriate water immiscible solvent with an appropriately high boiling point, for example methyl isobutyl ketone, kerosenes of high flash point (e.g. Norpar 13, Isopar M, Alkylate 6, etc.), or alcohols (e.g. isodecanol). Also, non-water soluble carboxylic acid polymers and oligomers as described above for the water soluble versions can also be used as an ammonia stripping material if a solvent or co-solvent is used to keep the ammonia stripping material in solution.

The spent weak acid containing the ammonia (e.g. ammonium carboxylate) can also be regenerated from its ammonium salt by reaction with nitrous acid follows:

$$RCOO^-NH_4^+ + HNO_2 \rightarrow RCOOH + N_2 + 2H_2O$$

(spent sorbent solution) (recycled to sorbent regeneration) Such nitrous acid can be derived from several sources separately or in combination, for example a mixture of sodium nitrate and strong mineral acid, or with a mixture of nitric acid and easily reducible substance such as waste organic material (food waste, biomass solids from waste biotreatment, low grade syrups, sugars, carbohydrates, organics already present in the waste from which the ammonia was sorbed and followed the ammonia by sorption on the bed, etc.). Such conditions are well known in the art as "Bouveault Amide Hydrolysis" conditions (p.86 of "Guide to Organic Reactions" by Howard D. Weiss, Burgess Publ. Co., Minneapolis, Minn., 1969).

The above reactions avoid the expensive distillation step to recover the weak acid. The conditions are milder than those of the NitRem process described herein. Under some conditions there still may be a need to control water balance by distillation of a purge stream. The weak acid should be selected to be resistant to oxidative attack by nitrous acid. For example acetic acid, propionic acid, adipic acid, succinic acid, the AGS mixture, etc. (Table of weak acids) should all be effective. Weak acids with alpha-hydroxy groups, e.g. glycolic acid, would not be effective since it would also be easily oxidized by the nitrous acid.

TABLE 6

Typical Examples of Acceptable Regenerant Weak Acids

| COMPOUND | pKa |
|---|---|
| Acetic acid | 4.8 |
| Adipic acid | 4.4 |
| Anilinium ion | 4.6 |
| Benzoic acid | 4.2 |
| n-butyric acid | 4.8 |
| Fumaric acid | 3.0 |
| Formic acid | 3.7 |
| Sulfoanilium ion | ~4 |
| Maleic acid | 6.2 |
| o-phthalic acid | ~3 |
| Propionic acid | 4.9 |
| Succinic acid | 4.2 |
| Tartaric acid | 3.0 |
| Lactic acid | 3.9 |
| Carbonic acid | 6.4 |
| Cyanic acid | 3.7 |
| Ferrocyanic acid | 3.0 |
| Hydrofluoric acid | 3.0 |
| Nitrous acid | 3.3 |
| Glycolic acid | 3.0 |
| Hydroxylammonium ion | 6.0 |
| Whey (source of lactic acid) | 3.8 |
| AGS[1] | ~4.2 |
| Hydrogen phosphate monobasic ion | 7.2 |

[1]A = adipic acid, G = glutaric acid, S = succinic acid, AGS is an adipic acid manufacturing byproduct of a mixture of these dicarboxylic acids Tables 7 and 8 list typical examples of acids that are unacceptable because of chelation or because of ionization where the $pK_a$ is too low.

TABLE 7

Typical Examples of Unacceptable Regenerant Acids Due to Chelation

| COMPOUND | pKa |
|---|---|
| Citric acid | 3.1 |
| EDTA salt | 6.2 |
| Glycine | 2.4 |
| NTA | 3.9 |
| Malonic acid | 2.9 |
| Oxalic acid, monoprotic salt | 4.3 |
| Pyrophosphoric acid, monobasic | 2.4 |
| 1,10-Phenanthrolinium | 5.0 |

TABLE 8

Typical Examples of Unacceptable Regenerant Acids Due low pKa
Examples of Unacceptable Regenerant Acids Due low pKa

| Arsenic acid | 2.3 |
|---|---|
| Phosphoric acid | 2.2 |
| Hydrogen sulfate ($2^{nd}$ proton on the sulfate) | 2.0 |
| Sulfurous acid | 1.8 |
| Sulfuric acid | >1 |

TABLE 8-continued

Typical Examples of Unacceptable Regenerant Acids Due low pKa
Examples of Unacceptable Regenerant Acids Due low pKa

| | |
|---|---|
| Nitric acid | >1 |
| Hydrochloric acid | >1 |
| Hydrobromic acid | >1 |
| Methane sulfonic acid | >1 |
| Trifluoroacetic acid | >1 |

Although zinc has been used throughout the examples for producing the sorbents such as the ion exchange resin and the metal hydroxide, other metals can also be used. Metals useful for producing the sorbents include Ag, Cd, Co, Cr, Cu, Hg, Ni, Pd and the like. These metals are expected to have similar regeneration schemes as outlined above for zinc. Zinc is preferred because of its nontoxic character in relation to animals and humans.

The preferred loading pHs for several metals disclosed herein are: silver (Ag) below 8, cadmium (Cd) below 6.7, chromium (Cr) below 5.2, cobalt (Co) below 6.8, copper (Cu) below 5.2, mercury (Hg) below 1.8, nickel (Ni) below 6.7, and zinc (Zn) below 6.8. As is known to those skilled in the art the upper limit is primarily determined by the pH at which a metal hydroxide precipitate forms. It should be noted that in preparing the resins of the examples that the first holding step at a low pH of about 1.2 is optional.

While not wishing to be bound by any particular hypothesis or theory, the theoretical explanations provided below are offered to help guide a person skilled in the art in understanding and using the invention. The following "chemistry model" as it is presently understood is useful for optimizing the performance or guide the selection of sorbent and $NH_3$ complexing metal ion materials to match a particular metal loaded sorbent system to a particular feed stream containing ammonium ion or ammonia. The findings from the examples herein are:

Stripping the ammonia from the sorbent with a strong acid alone elutes some of the $NH_3$-absorbing metal ion from the resin along with most of the ammonium ion despite the much higher charge of the metal ion relative to hydrogen ion (normally 2+ vs. 1+).

High concentrations of monovalent cations elute some of the $NH_3$ absorbing metal ion on the resin along with the ammonium ion despite its much higher charge (2+ vs. 1+).

Non-chelating weak acids are effective sorbent regenerants as they remove the ammonia, but not significant quantities of the $NH_3$ complexing metal ion, and the preferred use of non-chelating weak acids that also do not strongly sorb onto the sorbent, leaving residual acidity there which interferes with the $NH_3$ sorption cycle.

Complexing anions can affect the NH3 absorbing behavior of the sorbent.

Operational chemistry models are put forth below to aid in sorbent system selection for each of the above four findings.

Monovalent Ion Effects

For a monovalent cation, such as $Na^+$, to displace a +2 charged $NH_3$ complexing metal ion from the sorbent, either the $Na^+$ concentration needs to be very high, or the sorbent donor groups are too separated for cooperative bonding with the divalent metal ion, or a combination of these. The crosslinked, sulfonated polystyrene resins are largely used for water softening which requires easy removal of divalent hardness metal ions ($Ca^{2+}$, $Mg^{2+}$, $Fe^{2+}$) using a NaCl brine regenerant solution.

It is believed that on the average, these water softening resins have widely spaced $—SO_3^-$ groups, such that the $NH_3$ complexing metal ion, e.g. $Zn^{2+}$, can only bond to one $—SO_3^-$ group at a time, thus requiring the presence of another anion (e.g. $OH^-$, $Cl^-$, $SO_4^=$, $OAc^-$, etc.) for charge balance. Therefore, the +2 metal ion behaves as an easily eluted +1 metal ion illustrated as follows:

$$R—SO_3^-(ZnX)^+$$

where $ZnX^+$ can be $(ZnCl)^+$, $(Zn^{2+} (SO_4^=)_{1/2})$, $(ZnOAc)^+$, etc.

Figure 8:
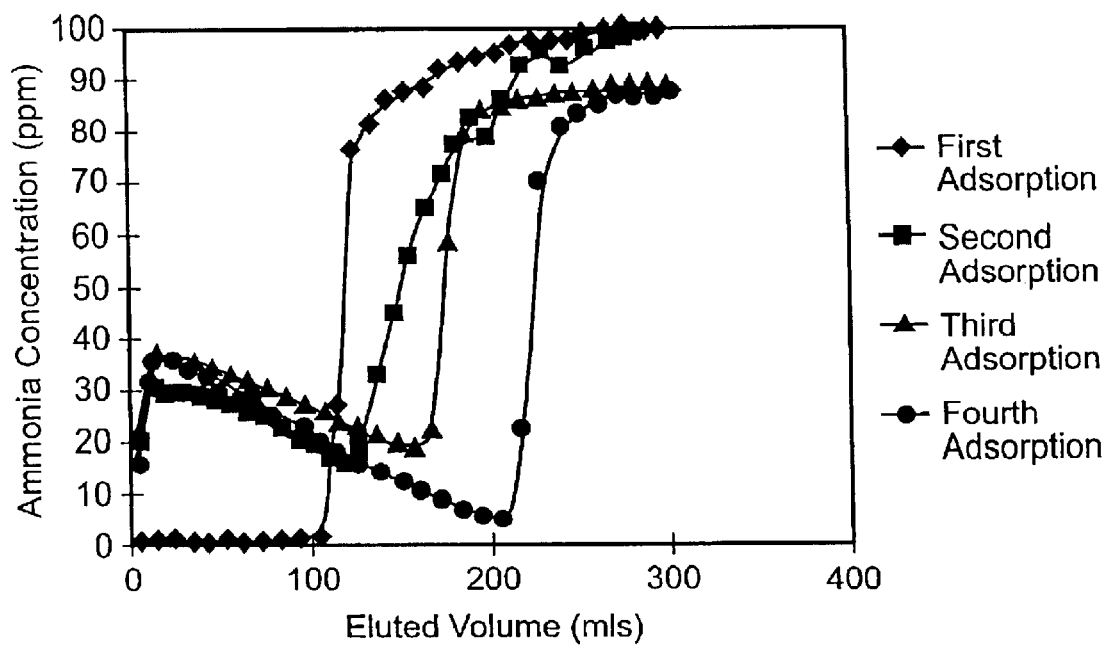
FIG. 8 is a graph showing ammonia breakthrough curves for pH 8.0, 100 ppm total ammonia, on 6 ml of Zn-Dowex™ Ligand 50WX2-400 ion exchange resin for four adsorption cycles.
Figure 9:
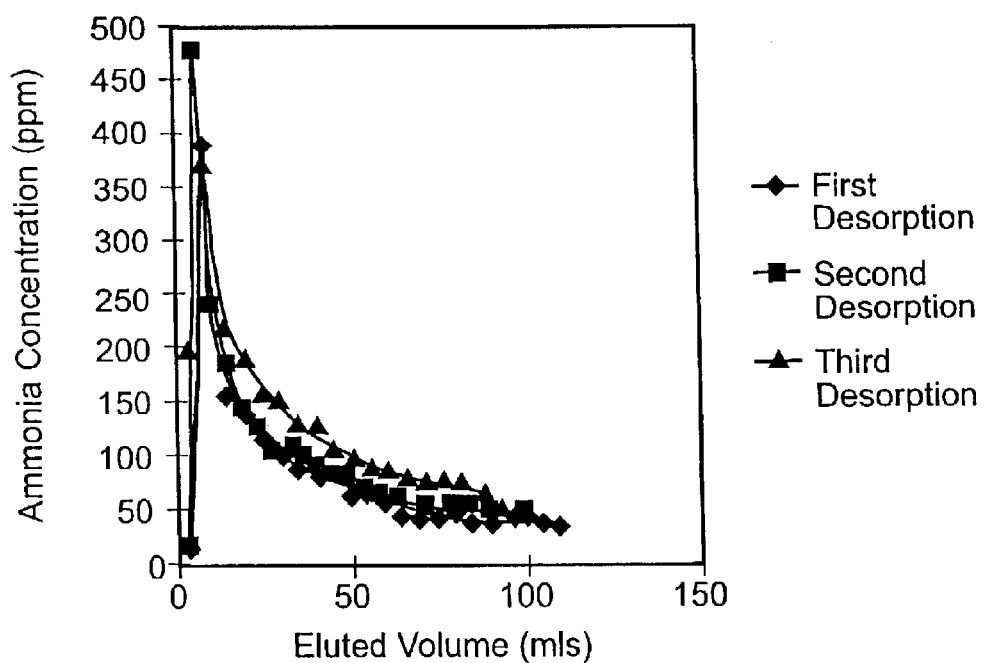
FIG. 9 is a graph showing the regeneration of an exchange column packed with Zn-Dowex™ Ligand 50WX2-400 ion exchange resin using acetic acid for three desorption cycles.

This mode of ion sorption is sufficient in the water softening case where the cations in the feed water are dilute and the competition for them minimal. However it is expected that $NH_4^+$ contaminated waters may contain significant concentrations of other cations, such as $Na^+$, and it is desired that the $NH_4^+$ be removed selectively over these other cations to avoid having to regenerate the sorbent too often. These other ions are normally dischargeable in the waste stream and their recovery is not wanted. Therefore, the above chemistry model indicates the preferred sorbent for the $NH_3$ complexing metal ion in the case where monovalent ions are present is one where the $—SO_3^-$ groups are in close proximity to one another, for example vicinal or gem, for example $RCH(SO_3^-)_2$ (e.g. Sybron IONAC SR-12) or chelation (e.g. amino methylene phosphonate, $R—NHCH_2PO_3H^-$, as is presented in the Serolite®ES-467). It will be useful in preparing the metal ion loaded feedstock of such sorbents that the NH3-complexing metal ion be added at one half of the amount of binding sites present to facilitate bonding of two resin binding sites per metal ion. In addition, if the acid form of the resin is used, that this excess acidity is neutralized, using NaOH for example, but that pHs greater than that needed for metal hydroxide precipitation be avoided until after any excess metal ion is removed by washing. It is believed that excess metal ion left on the resin may form metal hydroxide precipitate solids which could block microchannels in the sorbent, thereby reducing the apparent ammonia loading capacity. It is also wasteful of ammonia binding metal. Lastly, for ion exchange resins (non-chelating) there is also a probability that only one ionic bond to the metal ion will form, thereby resulting in the metals being held less tightly resulting in a portion of the metal ions being lost during use. These effects of the excess metal are less desirable than a stoichiometrically matched sorbent preparation but are still acceptable as the sorbent will be cycled many times during which the optimum composition naturally forms with the associated enhancement in performance (FIG. 8).

Effectiveness of Non-chelating Weak Acids, Especially Those of Low Hydrophobicity Removal of the $NH_3$ from the $NH_3^-$ loaded sorbent with minimal loss of $NH_3$ binding metal ion requires a balance of properties. The prior art, which used mineral acids to elute ammonium ion without the use of metal salts, also shows unacceptable losses of metal ion sorbent. It has now been discovered that acids can be used to elute ammonia as $NH_4^+$ provided the $pK_a$ of the acid is in the range of 3 to 7.5, preferably 3–6, and is none chelating. The following is the presently understood chemical explanation for this capability. Ion exchange resins, for example the sulfonated resin described elsewhere, function by exchanging one metal cation with another, either more highly charged or at higher concentration, or both, at the site of the anionic $RSO_3^-$ group(s). It is believed that strong acids (pKa <3, especially <1) have high ionic concentrations of H⁺ and its counter ion. In using columns or other "multi-staging" contactor, this effect becomes very pronounced as the $NH_3$-binding metal ion is forced by ion exchange to gradually (or rapidly at desirably high mineral acid concentrations) move down the column, leading to a steady bleeding of the $NH_3$-binding metal ion from the sorbent bed. The use of dilute acid eluants is undesirable since it leads to dilute $NH_4^+$ product eluant. Also, because of the above plate theory, and the requirements on toxic metal discharges, even dilute solutions of mineral acids lead to unacceptable losses of the $NH_3$-binding metal. However, weak acids possess similar amounts of acidity as mineral acids with which sorbed $NH_3$ can be converted to $NH_4^+$, but <1 percent of the hydrogen ion is present in ionized form. In fact, it is possible to have >99.999 percent of the acidic hydrogen present as the neutral molecule. For example, dissolved in water acetic acid is as $CH_3COOH$ and not $CH_3COO^- + H^+$, formic acid is as $HCOOH$ and not $HCOO^- + H^+$, while sulfuric acid, a strong mineral acid, is 100 percent as dissociated $H^+ + HSO_4^-$.

A second requirement is that the weak acid not be chelating in the pH region where the $NH_3$ is being eluted as $NH_4^+$. Chelation of the $NH_3$-binding metal by anionic, deprotonated weak acids, e.g. citric acid [$HOOCCH_2CH(OH)(COOH)CH_2COOH$] would leach the $NH_3$-binding metal from the sorbent. Tables 6 and 7 serve as a guide to selecting suitable weak acids with which to practice the invention.

Competitive Effects of Metal Ion Complexing Anions

The unique selectivity of the invention is believed to be due in part to the formation of a chemical bond between the $NH_3$-binding metal ion of the sorbent and the nitrogen atom of the $NH_3$ molecule. This chemistry provides selectivity for ammonia over the bulk of the cations, anions, and neutral molecules also contained in the water with the ammonia/ammonium ion. This understanding explains why in certain instances certain anions and neutral molecules appear to compete with ammonia for the sorption sites, thereby lowering the apparent capacity for ammonia. For example, chloride ion forms metallo-chloro bonds with some metals, e.g. $Zn^{2+}$, but not with others, e.g. $Ni^{2+}$. Therefore, if significant chloride ion levels are expected in the ammonia contaminated fluid, then an ammonia-binding metal such as $Ni^{2+}$ should be selected. This effect can be used to advantage by co-sorbing more than one solute from a feed solution. All that is required is that a sufficient quantity of sorbent is provided to provide the capacity to handle all of the contaminants expected including the ammonia. Examples of other contaminants which could be removed along with the ammonia are organic amines, cyanide ion, hydrogen cyanide, halides, etc.

II. Second General Embodiment

Broadly, the invention includes methods, materials, and apparatus for removing ammonia from fluid streams. The fluid streams include gaseous and liquid streams. When gaseous streams are used the ammonia from the gaseous stream is first extracted into a liquid stream and then extracted from the liquid stream.

Two main embodiments for ammonia recovery are disclosed herein. The first uses zinc sulfate for directly contacting a fluid stream and the second uses a metal-loaded ion exchange medium for contacting the fluid stream. Both embodiments are able to reversibly bind ammonia in a decomposable salt so that overall costs for the methods are reduced. Specifically, both embodiments use contact of ammonia (or ammonium) with zinc sulfate and sulfuric acid to produce a solution of mixed sulfates and then concentrate the solution sufficiently to cause crystallization of an ammonium zinc sulfate hydrate double salt. The crystals may then be heated in a known manner to release $NH_3$ and regenerate the zinc sulfate and sulfuric acid. As used herein the following terms have meanings as follows:

Sorbent—as used herein includes polymeric materials and solid materials having a surface area able to bind ammonia. The term sorbent and its related terms of speech are used generally herein to include both chemical and physical absorbents and adsorbents.

Metal-loaded media—as used herein includes metal loaded ion exchange materials, chelating materials, zeolites, and organic or inorganic materials. The important characteristic for these metal loaded media is that they be capable of reversibly binding ammonia. The metal should be firmly bound to the substrate material so as not to substantially unbind during the conditions of use. The metal loaded media should bind ammonia on exposure to an ammonia containing fluid stream and give up the ammonia when exposed to a strong acid.

Hydrate—as used herein means the hydrated form of the compound with any degree of hydration. For the ammonium zinc sulfate hydrate, the hexahydrate is the preferred compound and the most likely crystallization product according to the invention.

Pretreatment of the waste streams used in the invention is contemplated to the extent that solids, biological matter and the like are filtered out in pretreatment steps that are well known in the art of waste treatment (e.g. flocculation and settling tanks, biological treatment tanks). The pretreatment steps are useful in removing materials that would have a tendency to clog, coat or otherwise interfere with the ammonia recovery of the invention.

The invention stems from the recognition that when ammonium sulfate and zinc sulfate are present in a solution at concentrations exceeding the solubility limit, they may combine to form crystals of a hydrated zinc ammonium sulfate, probably $(NH4)_2SO_4 \cdot ZnSO_4 \cdot 6H_2O$ (zinc ammonium sulfate hexahydrate). These crystals are monoclinic and described as white or transparent (CRC Handbook of Chemistry and Physics 63rd edition, and Mellor's A Comprehensive Treatise on Inorganic and Theoretical Chemistry, 1929). Mellor notes that with an excess of ammonium sulfate, a near quantitative crystallization of the Zn is possible. The crystallization may be described by the expression:

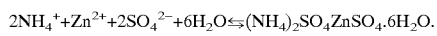

$$2NH_4^+ + Zn^{2+} + 2SO_4^{2-} + 6H_2O \leftrightarrows (NH_4)_2SO_4 \cdot ZnSO_4 \cdot 6H_2O.$$

The water solubility of this compound is given in the CRC Handbook as 7 g/100 g water at 0° C. and 42 g/100 g at 80° C. The solubility for the ammonia or zinc sulfates may be shifted by adding an excess of the other component. The CRC Handbook also notes that the compound decomposes before reaching its melting point.

The present invention comprises the use of ammonium zinc sulfate hydrate to selectively recover ammonia from an aqueous solution in a solid crystalline form. The water and ammonia may then be recovered by heating the crystals and recovering the water and ammonia in the off gases. This process would then leave behind zinc sulfate and sulfuric acid, which can be resolubilized and recycled.

While not being bound by any hypothesis or theory, the chemical reaction models provided below are offered to help guide the skilled person in the art in using the invention and in understanding possible explanations of the reactions. They may or may not accurately describe the exact conditions, which may prevail while practicing the invention.

The decomposition of the crystals may be described as:

$$(NH_4)_2SO_4 \cdot ZnSO_4 \cdot 6H_2O_{(s)} + heat \rightarrow 2NH_{3(g)} + Zn(HSO_4)_{2(s,l)} + 6H_2O_{(g)}$$

The heating may occur at a single temperature releasing both the water and the ammonia together, or at two or more separate temperatures. The first is a lower temperature process in which the crystals are broken down into water, zinc sulfate, and ammonium sulfate as shown by:

$$(NH_4)_2SO_4 \cdot ZnSO_4 \cdot 6H_2O_{(s)} + heat \rightarrow (NH_4)_2Zn(SO_4)_{2(s,l)} + 6H_2O_{(g)}$$

If the temperature is then increased, the zinc sulfate will melt, and the ammonium sulfate will decompose as follows:

$$(NH_4)_2Zn(SO_4)_{2(s,l)} + heat \rightarrow 2NH_{3(g)} + Zn(HSO_4)_{2(s,l)}$$

This decomposition is expected to initially occur between 200 and 250° C. It is also possible that under more severe temperature conditions the sulfuric acid may be evaporated to a significant extent or even broken into sulfur dioxide and water. This may be avoided to a great extent by keeping the temperature below about 330° C. If further heat treatment occurs, this may lead to the decomposition of the zinc bisulfate as:

$$Zn(HSO_4)_{2(s,l)} + heat \rightarrow ZnSO_{4(s,l)} + H_2O_{(g)} + SO_{3(g)}.$$

Figure 14:
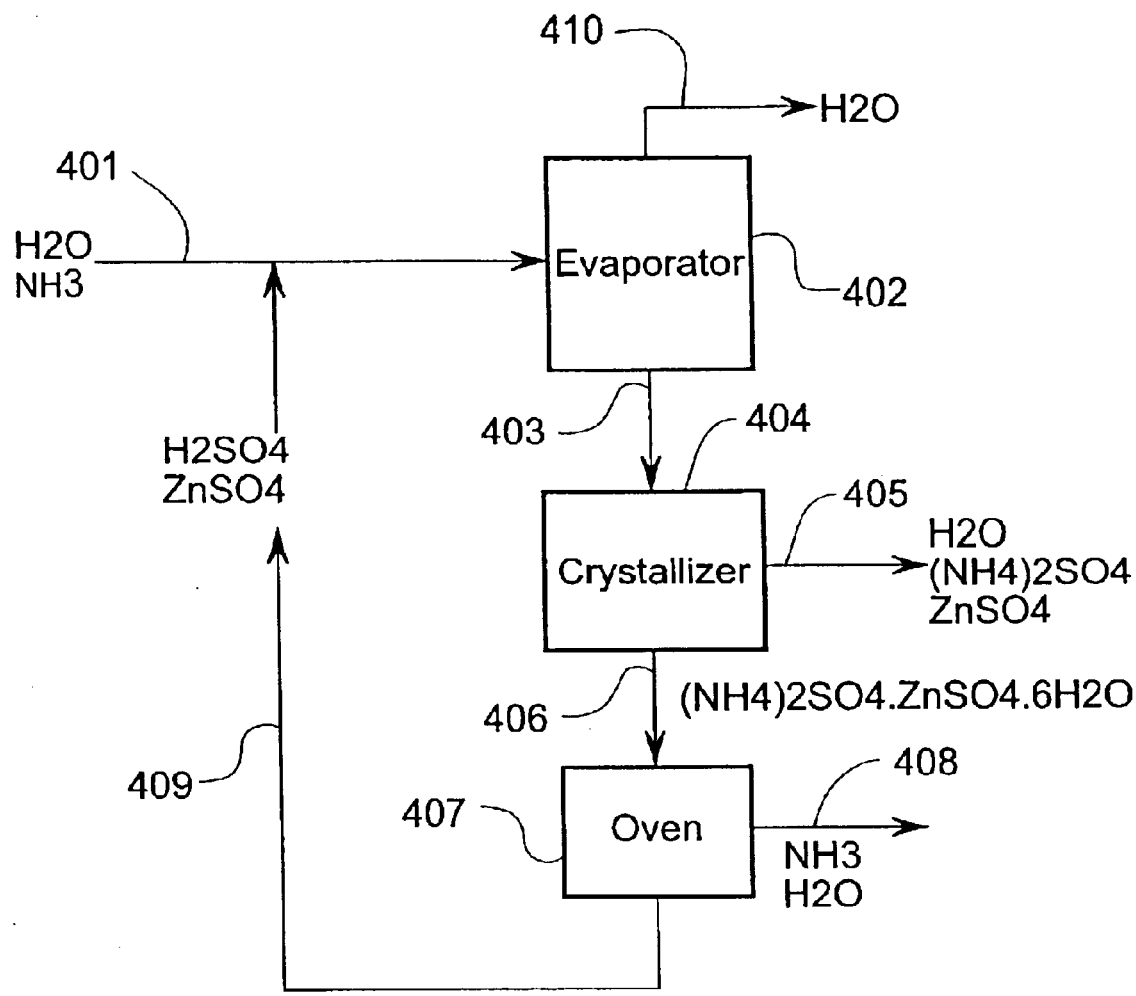
FIG. 14 is a schematic drawing of apparatus and process for ammonia recovery by direct treatment of ammonia waste streams with sulfuric acid and excess zinc sulfate to form ammonium zinc sulfate hydrate and subsequent decomposition by heating.

A schematic of the one embodiment of the invention utilizing $ZnSO_4$ directly to reduce ammonia from aqueous solution using the crystallization scheme is shown in FIG. 14. An aqueous ammonia stream 401 enters an evaporator 402 along with a zinc sulfate and sulfuric acid solution 409. Preferably the acid is in excess, so that the pH is less than neutral, preferably less than about 4.

The two solutions react in the evaporator 402 to produce a solution of zinc sulfate and ammonium sulfate. The evaporator then concentrates the stream (if necessary) by removing water 410 by conventional heating, vacuum or a combination of the two. The amount of evaporation required depends upon the initial concentration of the ammonia. If the ammonia concentration is high enough (resulting in ammonium sulfate concentration above the solubility limit) no evaporation may be required to reach the solubility limit of the zinc ammonium sulfate hydrate. It is apparent to those skilled in the art that a combination of the concentration, temperature and pressure can be used to control crystallization.

The resulting concentrated solution 403 is sent to the crystallizer 404. The crystallizer may be viewed as any single piece or combination of pieces of equipment capable of cooling the solution below the crystallization temperature and continuously or sequentially separating the crystals of zinc ammonium sulfate hydrate 406 from the mother liquor 405. Depending on the level of contaminants in the ammonia stream 401, multiple crystallization steps may be necessary. Zinc may also be recovered from the liquor 405 from the crystallizer 404 using a cation exchange resin or liquid-liquid extraction and with sulfuric acid regeneration. Optionally, the liquor 405 may be recycled and mixed with the ammonia stream 401 and/or the zinc sulfate/sulfuric acid solution 409. Again, a separate crystallizer may not be necessary if the concentration is raised sufficiently in the evaporator to precipitate the crystals in that equipment. Or the two steps (concentration and cooling) could be done in one vessel.

The amounts of ammonium sulfate and zinc sulfate exiting with the liquor 405 will depend on a number of controllable factors, including, but not limited to, the ratio of zinc sulfate to ammonium sulfate, absolute concentrations obtained in the evaporator, and the temperature at which crystallization is performed. The concentration of zinc or ammonia in the liquor 405 exiting the crystallizer may be reduced virtually to zero by operating in great excess of the other component.

The zinc ammonium sulfate hydrate crystals 406 are decomposed, for example, in oven 407 to release $NH_3$ and $H_2O$ in stream 408 while the zinc sulfate and sulfuric acid 409 are recycled. The oven 407 may actually be two or more ovens operating at multiple temperatures or one oven may operate stepwise at increasing temperature to sequentially remove the gases. Operating at low temperatures may remove most of the water, while operating at temperatures exceeding about 200° C. may then be used to recover the ammonia. The gaseous ammonia stream may be condensed to recover the ammonia or recovered as a salt by stripping the stream with an acid.

Under certain conditions, $SO_3$ may also be released while decomposing the crystals. This is not generally desired, but may occur under aggressive decomposition. In this case, it may be possible to capture the $SO_3$ and $NH_3$ downstream in a scrubber as ammonium sulfate.

Figure 15:
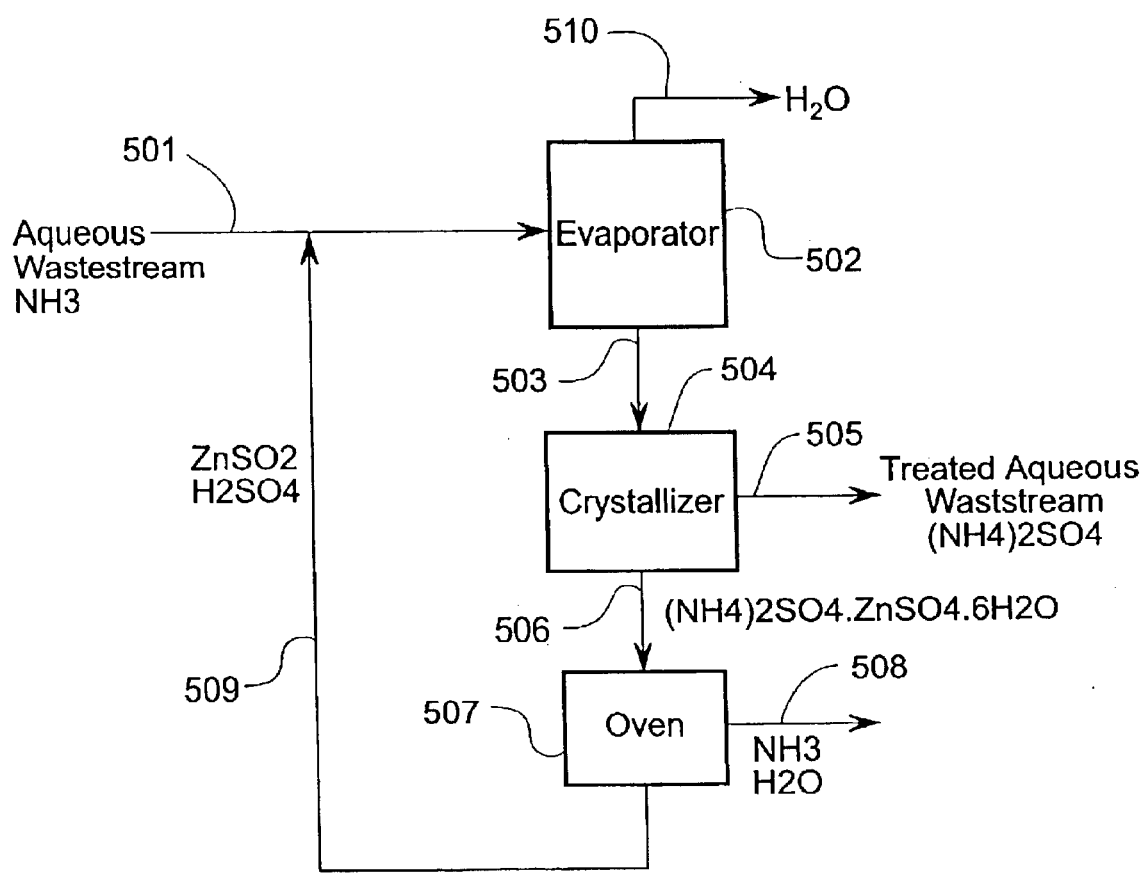
FIG. 15 is a schematic drawing of apparatus and process for ammonia recovery by direct treatment of highly concentrated ammonia waste streams with zinc sulfate and sulfuric acid to form ammonium zinc sulfate hydrate and subsequent decomposition by heating.

The formation and decomposition of ammonium zinc sulfate hydrate crystals may also be used to reduce the ammonia concentration of streams containing high levels of ammonia by direct treatment. The economics of this process are obviously improved by the fact that the need for evaporation is reduced. FIG. 15 shows a schematic of this process in the case where ammonia is in excess. In this case the wastewater stream 501 containing high levels of ammonia is concentrated in the evaporator 502 with the removal of water 510 and sent to the crystallizer 504. The resulting solution is cooled below the crystallization temperature to produce the crystals of zinc ammonium sulfate hydrate 506, which are sent to the oven 507. The remaining aqueous stream 505 leaving the crystallizer 504 will still contain ammonia, but this can be further reduced if necessary through the addition of adsorption columns. Once again, the zinc ammonium sulfate hydrate crystals are decomposed in oven 507 to release $NH_3$ and $H_2O$ in stream 508 while the zinc sulfate and sulfuric acid 509 are recycled.

Figure 16:
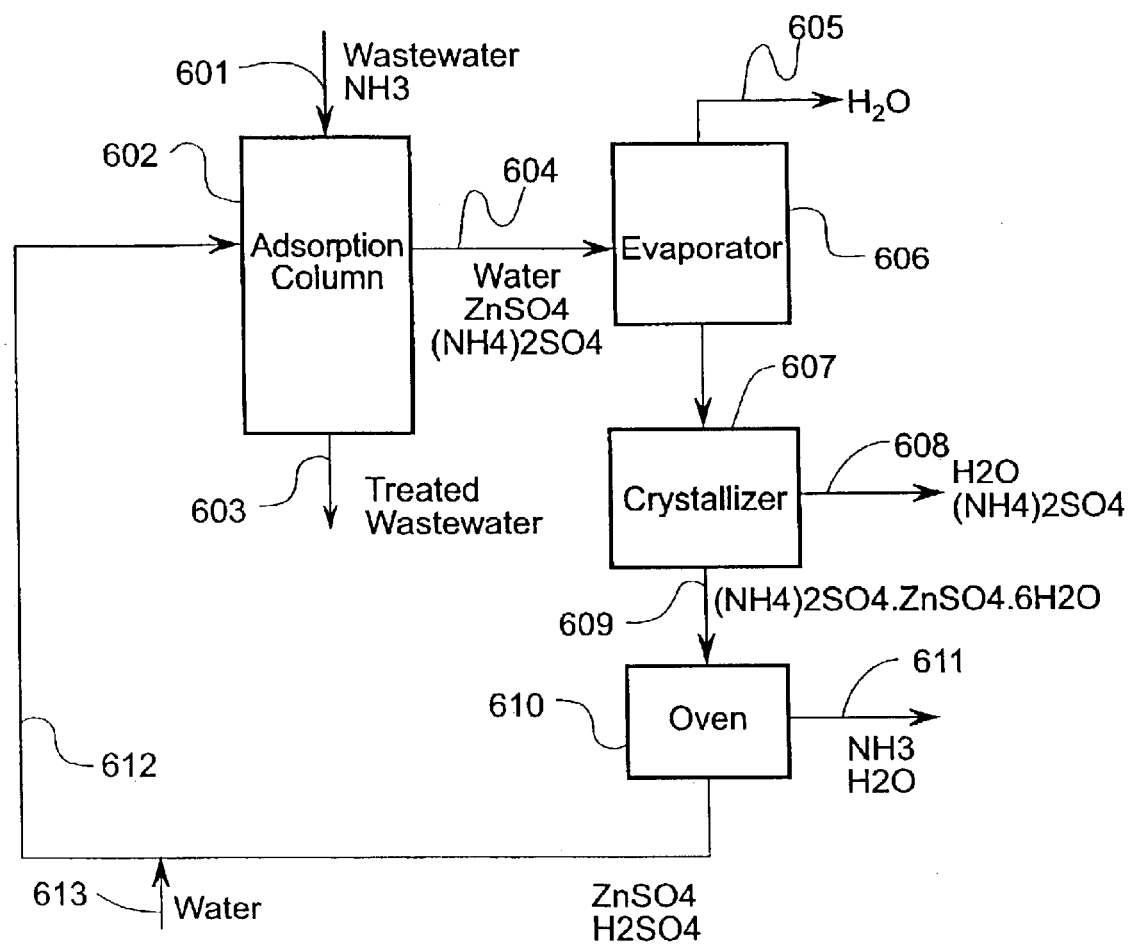
FIG. 16 is a schematic drawing of apparatus and process for ammonia recovery from waste streams by use of ammonium zinc sulfate hydrate crystallization and decomposition in the regeneration of zinc-loaded ion exchange resin where ammonia is in excess.

Another preferred method to reduce the ammonia concentration of aqueous streams is the use of ligand exchange adsorption using zinc adsorbed to a cation exchange resin and then regenerating the resin using a $ZnSO_4/H_2SO_4$ solution. This has proven to be very effective at removing the ammonia from the resin, surprisingly, without detrimental stripping of the zinc off the cation exchange resin. To be economically viable, the $ZnSO_4$ and the ammonia in the regeneration solution must be separated, so that the $ZnSO_4$ may be reused. FIG. 16 is a schematic drawing of apparatus for the formation and decomposition of ammonium zinc sulfate hydrate crystals which may be used to perform this separation when the ammonia is present in excess.

In the loading step, the ammonia-laden wastewater stream 601 contacts and is adsorbed by a sorbent (such as a zinc-loaded cation exchange resin) in an adsorption column 602. The discharged water stream 603, with significantly reduced ammonia concentration, can be reused or discharged. Multiple sorption columns can be used in parallel or series. The sorption columns may be packed, fluidized, trayed, and the like.

In the second step, chemical regeneration of the sorbent may be achieved by periodically stripping the column with the $ZnSO_4$ and $H_2SO_4$ stream 612. This strips the ammonia from the sorbent and carries it as an ammonium sulfate/zinc sulfate spent regeneration solution stream 604 to the evaporator 606 where the solution is concentrated by removal of water 605.

It has been discovered that the high acid stripping does not result in the detrimental removal of zinc from the resin (or from the column). While zinc may be continuously stripped to some degree during the regeneration step, the presence of Zn in the stripping solution causes what seems to be an equilibrium between the zinc ion in the aqueous phase and the bound form on the resin. So even if it is continuously stripped, it is also continuously replenished in the steady state.

Evaporation may be carried out in the conventional manner by, for example heating, vacuum or a combination of the two. The amount of evaporation required depends upon the initial concentration of the ammonia. If the ammonia concentration is high enough no evaporation may be required to reach the solubility limit of the ammonium zinc sulfate hydrate. It is apparent to those skilled in the art that a combination of the concentration, temperature and pressure can be used to control crystallization by reducing the solution to conditions below the solubility limit of zinc ammonium sulfate hydrate.

The resulting concentrated stream from the evaporator 606 is then discharged to the crystallizer 607 where the temperature is reduced below the crystallization temperature of the zinc ammonium sulfate hydrate. Again, a separate crystallizer may not be necessary if the concentration is raised sufficiently in the evaporator to precipitate the crystals in that equipment. The resulting crystals 609 are separated and discharged to the oven for regeneration of the zinc sulfate and sulfuric acid as described above. The remaining crystallizer aqueous stream 608 may be further processed to recover the ammonium sulfate, which can be sold or converted to sulfuric acid and ammonia through heating. The water and ammonia vapor stream 611 from the decomposition in the oven 610 may actually be two streams, one from a lower temperature oven containing the majority of the water and a second from a higher temperature oven containing the majority of the ammonia. The ammonia may be captured as ammonia by condensation or as a salt by using an acid stripper. The regenerated zinc sulfate and sulfuric acid are recycled to the sorption column 602. Makeup water 613 (preferably condensed from stream 605) may be added back to the stripping solution before return to the column.

Figure 17:
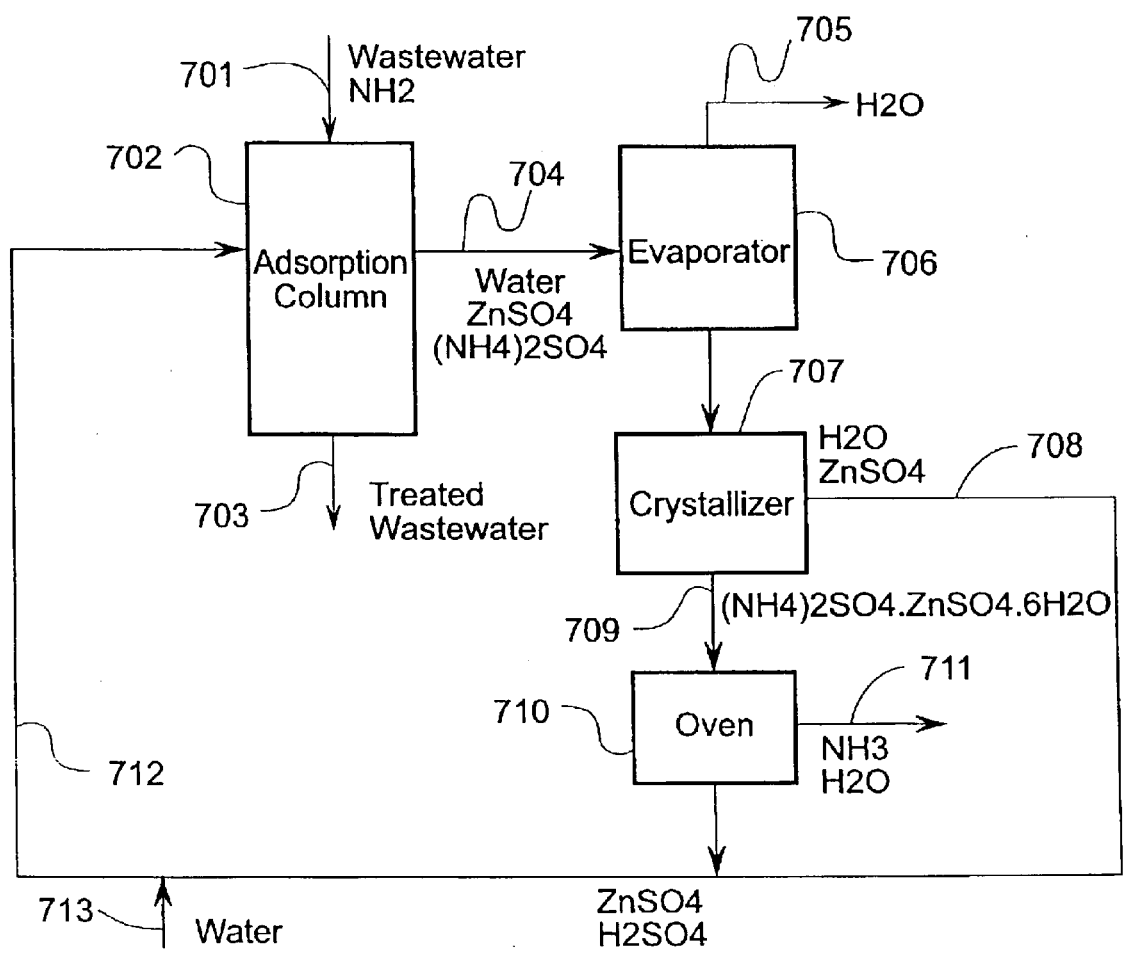
FIG. 17 is a schematic drawing of apparatus and process for ammonia recovery from waste streams by use of ammonium zinc sulfate hydrate crystallization and decomposition in the regeneration of zinc-loaded ion exchange resin where zinc is in excess.

FIG. 17 is a schematic drawing of apparatus and process for ammonia recovery from waste streams by use of ammonium zinc sulfate hydrate crystallization and decomposition in the regeneration of zinc-loaded ion exchange resin where zinc is in excess. The process is similar to that shown in FIG. 16 except that the crystallizer aqueous stream 708 contains largely $ZnSO_4$ which may be directly recycled back as regeneration solution, and substantially all of the ammonia exits from the ovens 710 in stream 711. The apparatus and streams have the following identifiers:

Wastewater stream containing ammonia—701
Sorption column—702
Treated wastewater—703
Zinc Sulfate/Ammonium Sulfate solution—704
Evaporated water—705
Evaporator—706
Crystallizer—707
$ZnSO_4$ liquid stream containing—708
Zinc ammonium sulfate hydrate crystals—709

-continued

Oven—710
$NH_3$, $H_2O$ offgas—711
$ZnSO_4/H_2SO_4$ recycle stream—712
Water makeup—713

EXAMPLE 1B

A 0.25 M $ZnSO_4$ solution containing 15,000 ppm of $NH_3$ in the form of ammonium sulfate was prepared. A total of 200.3 g of this solution was placed in a 250 ml flask, left open to the air, and boiled on a hotplate until the mass of the solution was reduced to 57.2 g. The solution was then left to cool on the counter until the formation of crystals was first noted. The flask was then placed in an ice bath to form additional crystals. The crystals were translucent white in color. The crystals were collected using a Buchner funnel. A total of 24.2 g of crystals was recovered. A fraction containing 9.718 g of the crystals was added to an aluminum weigh pan and placed in a drying oven at approximately 150° C. for approximately 2 hours. Visual examination of the solids after drying showed that they had become an opaque white powder losing much of their crystalline appearance. When the solids were reweighed, they were found to have been reduced to 6.965 g. This weight loss would be consistent with the loss of the water from the hydrated ammonium zinc sulfate.

The ammonia concentration of the crystals and the white powder was measured, by redissolving a measured quantity of the crystals or powder in a known amount of water, which was subsequently measured for ammonia concentration using an ammonia Orion ion specific electrode. The crystals were found to be 7.4% ammonia, while the dried powder was found to be 11.8% ammonia by weight. When the weight difference is taken into account, it can be seen that this initial drying did not remove any significant quantities of ammonia. Subsequently, 0.8601 g of the dried powder was placed in an aluminum weigh pan and gently heated with a propane torch. Melting was observed in the powder along with the evolution of a white gas. The torch heated powder was reweighed and found to have a mass of 0.7263 g. The powder was then resolubilized and measured for ammonia. The torch dried powder was found to have an ammonia concentration of 8.07% by weight corresponding with an ammonia reduction of 33.8% relative to the undried crystals.

The use of a furnace to remove the ammonia from the oven dried crystals was also performed. A 1.0437 g sample of the oven dried powder was placed in an aluminum weighed pan, then heated to 300° C. for 2 hours. When the sample was reweighed, it was found to have been reduced to 0.935 g. The powder was found to have an ammonia concentration of 8.2% by weight corresponding to an ammonia reduction of 29.7% relative to the undried. The use of the furnace was then repeated on 1.0092 g of oven dried powder at 350° C. for 2 hours. The weight of this sample was reduced to 0.7048 g and the powder was found to have an ammonia concentration of 5.0% by weight, corresponding to an ammonia reduction of 66.2% relative to the undried crystals. The results of these experiments are summarized in Table 1.

TABLE 1

Results Summary

| Sample | Relative Mass (g sample/g undried crystals) | Sample Ammonia Content (wt %) | Relative Ammonia Content (g ammonia/g undried crystals) |
|---|---|---|---|
| Undried Crystals | 1.000 | 7.4 | 0.074 |
| Oven dried powder 150° C. | 0.717 | 11.8 | 0.085 |
| Torch treated powder | 0.605 | 8.1 | 0.049 |
| Furnace treated powder 300° C. | 0.638 | 8.2 | 0.052 |
| Furnace treated powder 350° C. | 0.501 | 5.0 | 0.025 |

EXAMPLE 2B

A second trial was made in an attempt to repeat the crystallization results observed in Example 1B and to determine the amount of ammonia lost during boiling. A fraction of the recovered crystals from Example 1B was weighed, placed in a drying oven at approximately 150° C. for 2.5 hours, and reweighed. A visual inspection of the dried powder showed that it had become more opaque and lost much of its original crystalline appearance. A 35.6% weight loss was found during drying which would be consistent with the removal of the hydration water and some free water from the crystals. As in Example 1B, samples of the dried powder and the undried crystals were solubilized and measured for ammonia concentration. The undried crystals were found to have an ammonia concentration of 7.52% and the dried powder was found to have an ammonia concentration of 11.80%. When corrected for the weight loss, this result indicates that no ammonia was lost during this low temperature drying. This is consistent with the hypothesis that the ammonium zinc sulfate hydrate can be dried at relatively low temperatures to remove the hydration water. Samples of the oven-dried powder were then placed in a furnace at 300° C. and 350° C. for 2 hours. The samples showed respective weight losses of 7.5% and 37.4% relative to the dried powder. The ammonia concentrations in the furnace treated powders were 8.6% and 3.1% for the powders treated at 300° C. and 350° C. respectively. The results from the second trial are summarized in Table 2.

TABLE 2

Results Summary

| Sample | Relative Mass (g sample/g undried crystals) | Sample Ammonia Content (wt %) | Relative Ammonia Content (g ammonia/g undried crystals) |
|---|---|---|---|
| Undried Crystals | 1.000 | 7.5 | 0.075 |
| Oven dried powder 150° C. | 0.644 | 11.8 | 0.076 |
| Furnace treated powder 300° C. | 0.596 | 8.6 | 0.051 |
| Furnace treated powder 350° C. | 0.403 | 3.1 | 0.012 |

EXAMPLE 3B

A total of 200 ml of a 0.25 M $ZnSO_4$ solution containing 14,286 ppm ammonia in an ammonium sulfate form was prepared and placed in a preweighed 250 ml flask with a magnetic stir bar. The pH of this solution was adjusted to 5.5 using 1 M NaOH. A 10 ml sample of this solution was taken before the flask was corked and attached to a gas dispersion tube containing 400 ml of 0.1 M $H_2SO_4$. The flask was then placed on a hot plate and boiled until the mass of the solution was reduced from 201 g to 66.9 g. The flask was then disconnected from the gas dispersion tube and allowed to cool in the ambient air until the first crystals began to form. The flask was then placed in an ice bath for further crystal formation. The cooled solution was then filtered using a Buchner funnel to recover the crystals. A total of 20.7 g of crystals was recovered along with 42.8 g of spent mother liquor. The contents of the gas dispersion tube were also collected and were found to weigh 575.7 g. A fraction of the collected crystals was then placed in a drying oven at approximately 150° C. for 2.5 hours. Samples of the resultant dried powder were further heat treated by placing them in a furnace at 304° C. for two hours or 309° C. for six hours or 350° C. for 2 hours. The ammonia concentrations of the crystals and heat treated powders were then measured by dissolving them in a known quantity of water and measuring the ammonia concentration with an ammonia ion selective electrode. The results of this experiment are presented in Table 3.

TABLE 3

Summary of Results from Heat Treatment of Crystals

| Sample Treatment | % Ammonia Removed | % Mass Removed |
|---|---|---|
| Undried Crystals | 0.0 | 0.0 |
| Crystals Dried at 150° C., 2.5 hr. | −1.0 | 35.6 |
| Powder Heat Treated at 304° C., 2 hr. | 32.7 | 42.3 |
| Powder Heat Treated at 309° C., 6 hr. | 74.5 | 53.9 |
| Powder Heat Treated at 350° C., 2 hr. | 84.0 | 59.7 |

EXAMPLE 4B

This example demonstrates that a $ZnSO_4/H_2SO_4$ solution may be used to strip ammonia from a zinc loaded ion exchange resin. A small laboratory adsorption column was set up containing 6 ml of Dowex 50WX8-400 ion exchange resin preloaded with $Zn^{2+}$. This was loaded with ammonia by passing approximately 45 bed volumes of dilute ammonium sulfate solution with an ammonia concentration of 1000 ppm and a pH of 8.0 over the column. The column was then rinsed with deionized water before passing approximately 13 bed volumes of 0.5 M $ZnSO_4$ solution, which had been pH adjusted to 4.0 using 1 M $H_2SO_4$. A fraction collector was used to collect approximately 6.5 ml samples of the spent regeneration solution. These samples were pH adjusted to greater than pH 12.0 using 5 M NaOH and the ammonia concentration was measured using an ammonia ion selective electrode calibrated against 0.5 M $ZnSO_4$ solution with a known ammonia concentration. The concentration profile clearly showed the existence of stripped ammonia in the spent regeneration solution.

EXAMPLE 5B

This example demonstrates that a $ZnSO_4/H_2SO_4$ solution may be used to load metal ions on a column and to regenerate a column, which has been loaded with ammonia. A small laboratory adsorption column was filled with 6 ml of Dowex 50WX8-400 ion exchange resin. The resin bed was washed by flowing deionized water through the column at 3 ml/min for 45 minutes. The column was then loaded with $Zn^{2+}$ ions by running an aqueous solution containing 0.5 M $ZnSO_4$/5% $H_2SO_4$ through the column at 3 ml/min for 45 minutes. The column was then rinsed using deionized water at 3 ml/min for 45 minutes.

This column was used to remove ammonia from a municipal wastewater centrate sample obtained from the Jackson Pike Municipal Wastewater treatment facility in Columbus, Ohio. This sample was centrifuged and filtered through a What an #40 paper filter to remove large particulate matter. The pH of the sample was found to be 8.35 and the ammonia concentration of the sample was found to be 1140 ppm. The filtered, wastewater centrate was fed to the column at 3 ml/mm and 20 samples containing 160 seconds off effluent were collected. The ammonia was the stripped from the column using an aqueous solution containing 0.5 M $ZnSO_4$/5% $H_2SO_4$ that was fed to the column at 2 ml/mm for 50 minutes. The column was finally rinsed with deionized water at a flowrate of 3 ml/mm for 30 minutes. The collected samples ammonia concentration was measured by adjusting the pH to greater than 12 with sulfuric acid and measuring the ammonia concentration using an Orion ion specific electrode. The total ammonia adsorbed on the column was determined by differences. The ammonia loading/stripping procedure was then repeated on the same column in an identical manner.

In the first run, a total ammonia loading of 16.3 g $NH_3$/l of resin was achieved. Following the regeneration of the resin using 0.5 M $ZnSO_4$/5% $H_2SO_4$ a total ammonia loading of 15.9 g $NH_3$/l of resin was achieved. An approximately 97% recovery of the $Zn^{2+}$ loaded resins was obtained following regeneration. This demonstrates the effectiveness of 0.5 M $ZnSO_4$/5% $H_2SO_4$ for loading and regenerating the resin.

Resins useful with the second general embodiment are the same as those listed in the first general embodiment above.

While zinc has been used throughout the examples for preparing metal sulfates (or other salts) and for loading the metal loaded resins, other metals can also be used. Metals useful include Ag, Cd, Co, Ca, Cr, Hg, Mg, Mn, Zn, Zr, Fe (II and III), Ce, Cu, Al, Ni, Pd, and the like. The metals may be used alone or in combination with one or more other metals. These metals are expected to have similar regeneration schemes as outlined above for zinc. Zinc is preferred because of its nontoxic character in relation to animals and humans and its solubility properties as a salt and double salt.

While sulfuric acid has been used throughout the examples for reacting with the ammonium to form the ammonium salt, other strong acids such as sulfurous, phosphoric, carbonic or hydrochloric may be used. Obviously, they may have some properties that may reduce their value in some applications, but they may find some use.

The preferred loading pHs for several metals disclosed herein are: chromium (Cr) below 5.2, cobalt (Co) below 6.8, copper (Cu) below 5.2, nickel (Ni) below 6.7, and zinc (Zn) below 6.8. As is known to those skilled in the art the upper limit is primarily determined by the pH at which a metal hydroxide precipitate forms. It should be noted that in preparing the resins of the examples that the first holding step at a low pH of about 1.2 is optional.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A method for removing ammonia from a fluid comprising:
   a. contacting said fluid with a sorbent comprising metal cation loaded media at conditions adapted to load ammonia onto said sorbent and produce an ammonia depleted fluid;
   b. separating said ammonia depleted fluid from said ammonia loaded sorbent;
   c. separating said ammonia from said ammonia loaded sorbent by contacting said sorbent with a regenerant stripping solution comprising
      (1) a non-chelating weak acid having a $pK_a$ of about 3 to about 7.5, and which is selected from the group consisting of dimeric, trimeric, oligomeric, and polymeric carboxylates, wherein an ammonium salt solution is formed producing a spent stripping solution and regenerated sorbent; or
      (2) a strong acid and a metal salt, wherein an ammonium salt solution is formed producing a spent stripping solution and regenerated sorbent; and
   d. separating said spent stripping solution from said regenerated sorbent.

2. The method according to claim 1, wherein said sorbent comprises sorbent types selected from the group consisting or polymers of acrylamides containing metal complex groups, of aminophosphonates, aminodiacetates, carboxylates, phosphonates, diphosphonates, and sulfonates including chelators.

3. The method according to claim 1, comprising separating ammonia from said spent stripping solution.

4. The method according to claim 1, wherein a metal cation loaded on said metal cation loaded media is derived from a metal selected from the group consisting of Ag, Cd, Co, Cr, Cu, Hg, Ni, Pd, Zn, and combinations thereof.

5. A method for recovering ammonia from a fluid comprising:
   a. contacting said fluid with a sorbent comprising metal cation loaded media at conditions adapted to load ammonia onto said sorbent;
   b. separating said ammonia loaded sorbent from said fluid;
   c. separating said ammonia from said ammonia loaded sorbent by contacting said sorbent with a stripping solution comprising
      (1) a non-chelating weak acid having a $pK_a$ of about 3 to about 7.5, and which is selected from the group consisting of dimeric, trimeric, oligomeric, and polymeric carboxylates, wherein said sorbent is regenerated and an ammonium-weak acid salt solution is formed in a spent stripping solution; or
      (2) sulfuric acid and zinc sulfate salt, wherein said sorbent is regenerated and an ammonium-zinc sulfate hydrate solution is formed in a spent stripping solution;
   d. separating said spent stripping solution from said regenerated sorbent;
   e. separating said ammonium-weak acid salt or said ammonium-strong acid salt from said spent stripping solution; and
   f. treating said ammonium salt solution to recover products therefrom.

6. A method for recovering ammonia from a fluid comprising:
   a. contacting said fluid with a sorbent comprising metal cation loaded media at conditions adapted to load ammonia onto said sorbent and produce an ammonia depleted fluid;
   b. separating said ammonia depleted fluid from said ammonia loaded sorbent;
   c. separating said ammonia from said ammonia loaded sorbent by contacting said ammonia loaded sorbent with a regenerant comprising a non-chelating weak acid having a $pK_a$ of about 3 to about 7.5, and which is selected from the group consisting of dimeric, trimeric, oligomeric, and polymeric carboxylates, wherein an ammonium regenerant salt solution is formed.

7. The method according to claim 6, comprising:
separating at least some of said ammonium from said ammonium regenerant salt.

8. The method according to claim 7, comprising:
separating said ammonium from said ammonium regenerant salt with a step selected from the group consisting of: heating, applying a vacuum, and a combination thereof.

9. The method according to claim 6 comprising:
separating said ammonium from said regenerant salt by the step of contacting with a strong acid to form regenerant and an ammonium strong acid salt; and
separating said regenerant therefrom.

10. The method according to claim 6 comprising: wherein said regenerant is a weak organic acid.

11. The method according to claim 6 comprising:
contacting and reacting said separated ammonia with nitric acid to form ammonium nitrate; and
heating said ammonium nitrate and reacting at a temperature and pressure under hydrothermal conditions to decompose said ammonium nitrate to substantially nitrogen gas and water.

12. An apparatus for recovering ammonia from a fluid comprising:
   means for enclosing a metal cation loaded media able to reversibly load ammonia;
   inlet means, at an inlet portion of said means for enclosing, for admitting fluid or regenerant;
   outlet means, at an outlet portion of said means for enclosing, for exiting treated fluid or reacted regenerant; and
   regenerant source means comprising non-chelating weak acid having a $pK_a$ of about 3 to about 7.5, and which is selected from the group consisting of dimeric, trimeric, oligomeric, and polymeric carboxylates, operatively connected to said inlet means.

13. A method for recovering ammonia from a fluid comprising:
   a. contacting said fluid with a sorbent comprising a metal cation loaded media, in a manner adapted to load ammonia on said sorbent;
   b. separating said ammoniated sorbent and said fluid;
   c. separating said ammonia from said ammoniated sorbent by contacting said ammoniated sorbent with a non-chelating weak acid having a $pK_a$ of about 3 to about 7.5, and which is selected from the group consisting of dimeric, trimeric, oligomeric, and polymeric carboxylates to form a regenerant/ammonia salt; and
   d. separating said ammonia from said regenerant by one or more steps selected from the group consisting of:
      (1) heating said ammonia/regenerant complex;
      (2) applying a vacuum to said ammonia/regenerant complex; and
      (3) contacting said ammonia/regenerant complex with a strong acid.

14. The method according to claim 13, comprising:
   e. recycling said sorbent and/or said regenerant.

15. The method according to claim 13, comprising: wherein said regenerant comprises a weak organic acid.

16. An apparatus for recovering ammonia from a fluid comprising:
   a. a container enclosing a metal cation loaded media, said metal loaded media able to reversibly load ammonia;
   b. an inlet in said container for admitting fluid or regenerant to said container;
   c. an outlet in said container for exiting treated fluid or reacted regenerant from said container; and
   d. a source of regenerant comprising non-chelating weak acid having a $pK_a$ of about 3 to about 7.5, and which is selected from the group consisting of dimeric, trimeric, oligomeric, and polymeric carboxylates, operatively connected to an inlet at said container.

17. The apparatus according to claim 16, comprising:
   e. an ammonia separator for receiving and separating ammonia from said regenerant, operatively connected to said outlet.

18. The apparatus according to claim 17, comprising:
a chemical reactor operatively connected to said ammonia separator, for reacting separated ammonia from said separator with a strong acid; and
a regenerant separator, operatively connected to said reactor, for separating said regenerant from said strong acid.

19. The apparatus of claim 18, comprising
recycling apparatus for providing regenerant from said regenerant separator to said inlet.

20. The apparatus of claim 17, comprising:
   f. a reactor for mixing and reacting nitric acid, operatively connected to said ammonia separator, for producing ammonium nitrate; and
   g. a hydrothermal reactor, operatively connected to said reactor, for degrading said ammonium nitrate to nitrogen gas and water.

21. The apparatus according to claim 16, wherein a metal cation loaded on said metal cation loaded media is derived from a metal selected from the group consisting of Ag, Cd, Co, Cr, Cu, Hg, Ni, Pd, Zn, and combinations thereof.

22. A method for removing ammonia from a fluid comprising:
   a. contacting said fluid with a sorbent of metal cation loaded media in a manner adapted to load ammonia onto said sorbent;
   b. separating said fluid from said ammonia-loaded sorbent;
   c. contacting said separated ammonia loaded sorbent with a stripping solution of a strong acid and a metal salt, wherein an ammonium salt is formed with said metal salt in a spent stripping solution and said ammonia loaded sorbent is regenerated to a sorbent of metal cation loaded media;
   d. separating said spent stripping solution from said regenerated sorbent of metal loaded media; and e. treating said separated spent stripping solution in a manner adapted to crystallize an ammonium-metal therefrom.

23. The method according to claim 22, comprising crystallizing said ammonium salt by increasing the concentration of said ammonium salt and metal salt in said spent stripping solution by evaporation, by decreasing the temperature of highly concentrated solutions, or by a combination of evaporation and decreasing temperature.

24. The method according to claim 23, wherein said crystallization conditions comprise seeding with recycled ammonium sulfate crystals to minimize scaling and to control crystallization rate and crystal size.

25. The method according to claim 23, wherein a metal cation loaded on said metal-loaded media is derived from a metal selected from the group consisting of Ag, Cd, Co, Cr, Cu, Hg, Ni, Pd, Zn, and combinations thereof.

26. The method according to claim 22, comprising using metal cation loaded media wherein a metal cation loaded on said metal cation loaded media is derived from a metal selected from the group consisting of Ag, Cd, Co, Cr, Cu, Hg, Ni, Pd, Zn, and combinations thereof.

27. The method according to claim 26, comprising metal cation loaded media wherein said metal cations may be used alone or in combination with one or more other metal cations.

28. The method according to claim 26, comprising using a metal salt wherein a metal salt of said stripping solution is derived from a metal selected from the group consisting of Ag, Cd, Co, Cr, Cu, Hg, Ni, Pd, Zn, and combinations thereof.

29. The method according to claim 28, comprising using metal cations alone or in combination with one or more other metal cations.

30. The method according to claim 22, wherein the metal cations of said metal cation loaded media and the metal salts of said stripping solution are derived from the same metal.

31. The method according to claim 22, wherein the metal cations of said metal cation loaded media and the metal salts of said stripping solution are derived from zinc.

32. The method according to claim 22, wherein the metal cations of the metal cation loaded media and the metal salts of said stripping solution are derived from metals that form double salts with ammonia.

33. The method according to claim 22, wherein said strong acid in said stripping solution is selected from the group consisting of sulfuric, sulfurous, phosphoric and hydrochloric.

34. The method according to claim 22, wherein said strong acid is sulfuric acid.

35. The method according to claim 22, comprising the additional steps of separating at least some of the ammonia from the salt and recycling at least some of the remaining constituents for preparation of said stripping solution.

36. The method according to claim 35, comprising the additional step of separating said ammonia from said ammonium-metal double salt by decomposition with heat.

37. The method according to claim 22, wherein the sorbent types useful in the invention are selected from the group consisting of polymers of acrylamides containing metal complex groups, of aminophosphonates, aminodiacetates, carboxylates, phosphonates, diphosphonates, and sulfonates including chelators made therefrom, and mixtures of the foregoing.

38. A method for removing ammonia from wastewater comprising:
a. contacting an ammonia-laden wastewater stream with a zinc-loaded cation exchange resin to load the ammonia;
b. separating said zinc-loaded cation exchange resin containing said loaded ammonia and stripping the ammonia with a stripping solution of $ZnSO_4$ and $H_2SO_4$ to form a spent regeneration solution of ammonium sulfate and zinc sulfate; and
c. crystallizing zinc ammonium sulfate hydrate therefrom.

39. The method according to claim 38, comprising the additional step of recovering said zinc ammonium sulfate hydrate and decomposing to recover ammonia.

40. The method according to claim 39, comprising the step recovering zinc sulfate and sulfuric acid from said decomposition recycling.

41. The method according to claim 39, comprising crystallization of the zinc ammonium sulfate hydrate by evaporation of the spent regeneration solution by heating, vacuum, or a combination of heating and vacuum, and subsequent cooling.

42. The method according to claim 41, wherein after crystallization of said spent regeneration solution, the remaining aqueous liquid is further processed to recover ammonium sulfate or is recycled back for use in preparing stripping solution.

43. The method according to claim 39, wherein said crystals are decomposed by heating, wherein water and ammonia vapors are released.

44. The method according to claim 43, wherein the crystals are heated at a first lower temperature to remove water, and subsequently heating at a second higher temperature to remove ammonia.

45. The method according to claim 44, wherein said heating reaction is continued to release $SO_2/SO_3$ gas; and then capturing said gas as ammonium sulfate in an absorption column.

46. The method according to claim 45, wherein said ammonia is captured as ammonia by condensation or as a salt by using an acid stripper.

47. The method according to claim 45, wherein said acid stripper is phosphoric or nitric acid.

48. An apparatus for recovering ammonia from an ammonia-containing fluid comprising:
a. a fluid-contacting device containing an ammonia sorbent of metal cation loaded media;
b. means for contacting said ammonia-containing fluid with said ammonia sorbent and loading said ammonia thereon to form an ammonia-depleted fluid;
c. means for removing said ammonia-depleted fluid from the contacting device;
d. means for contacting said ammonia-loaded sorbent with a stripping solution of a strong acid and a metal salt to form a spent regeneration solution of ammonium salt and metal salt wherein said strong acid and said metal salt are present in said means for contacting said ammonia loaded sorbent; and
e. means for treating said spent regeneration solution to crystallize an ammonium-metal double salt therefrom.

49. The apparatus according to claim 48, further comprising:
f. an evaporator for increasing the concentration of said ammonium salt and metal salt in said spent regeneration solution and/or a cooling device for cooling said spent regeneration to cause crystallization.

50. The apparatus according to claim 49, wherein said evaporator and said cooling device comprise the same piece of apparatus.

51. The apparatus according to claim 50, further comprising a condenser to recover said ammonia vapor or a contacting device to capture ammonia as a salt by using an acid stripper.

52. The apparatus according to claim 48, further comprising one or more heating devices for decomposing said crystals to release water and ammonia vapors.

53. The apparatus according to claim 48, wherein a metal cation loaded on said metal cation loaded media is derived from a metal selected from the group consisting of Ag, Cd, Co, Cr, Cu, Hg, Ni, Pd, Zn, and combinations thereof.

54. A method for recovering ammonia from a fluid comprising:
   a. contacting said fluid with a sorbent comprising metal cation loaded media at conditions adapted to load ammonia onto said sorbent and produce an ammonia depleted fluid;
   b. separating said ammonia depleted fluid from said ammonia loaded sorbent;
   c. washing said ammonia loaded sorbent with an intermediate polarity solution to remove water therefrom;
   d. separating said ammonia from said ammonia loaded sorbent by contacting said ammonia loaded sorbent with a stripping solution of a regenerant comprising a substantially water insoluble non-chelating weak carboxylic acid having a $pK_a$ of 3 to 7.5, and which is selected from the group consisting of dimeric, trimeric, oligomeric, and polymeric carboxylates, wherein regenerated sorbent and an ammonium regenerant salt solution is formed in a spent stripping solution;
   e. separating said spent stripping solution from said regenerated sorbent; and
   f. washing said regenerated sorbent with an intermediate polarity solvent to remove residual carboxylic acid therefrom before reuse thereof.

55. The method according to claim 54, comprising:
   g. separating said ammonium salt solution from said spent stripping solution.

56. The method according to claim 55, wherein ammonia is recovered from said salt by heating.

57. The method according to claim 55, wherein ammonia is recovered from its ammonium weak acid salt solution by reaction with nitric acid or nitrous acid under mild conditions of heat at less than 100C.

58. The method according to claim 57, wherein said weak acid salt is derived from an acid selected from the group consisting of acetic acid, propionic acid, adipic, acid, succinic acid, and AGS.

59. The method according to claim 54, wherein said carboxylic acids are selected from the group consisting of dimeric, trimeric, oligomeric, and polymeric nonchelating carboxylates.

60. The method according to claim 59, wherein said carboxylates are acrylic acid homopolymer, maleic anhydride homopolymer, ethylene/acrylic acid copolymer, or ethylene/methylacrylic acid copolymer.

61. The method according to claim 59, wherein said carboxylates have a chain length of up to about 100 repeat units.

62. The method according to claim 59, wherein said carboxylates are oligomers having up to about 10 repeating units.

63. An apparatus for recovering ammonia from a fluid without detrimental stripping of metal from an exchange resin comprising:
   means for enclosing a metal cation loaded exchange resin able to reversibly load ammonia; inlet means, at an inlet portion of said means for enclosing, for admitting fluid or regenerant;
   outlet means, at an outlet portion of said means for enclosing, for exiting treated fluid or reacted regenerant; and
   regenerant source means comprising non-chelating weak acid having a $pK_a$ of 3 to 7.5, and which is selected from the group consisting of dimeric, trimeric, oligomeric, and polymeric carboxylates, operatively connected to said inlet means.

64. A method for removing ammonia from a fluid comprising:
   a. contacting said fluid with a sorbent comprising metal cation loaded media at conditions adapted to load ammonia onto said sorbent and produce an ammonia depleted fluid;
   b. separating said ammonia depleted fluid from said ammonia loaded sorbent;
   c. separating said ammonia from said ammonia loaded sorbent by contacting said sorbent with a regenerant stripping solution comprising a strong acid and a metal salt, wherein an ammonium salt solution is formed producing a spent stripping solution and regenerated sorbent; and
   d. separating said spent stripping solution from said regenerated sorbent.

65. A method for removing ammonia from a fluid comprising:
   a. contacting said fluid with a sorbent comprising metal cation loaded media at conditions adapted to load ammonia onto said sorbent and produce an ammonia depleted fluid;
   b. separating said ammonia depleted fluid from said ammonia loaded sorbent;
   c. separating said ammonia from said ammonia loaded sorbent by contacting said sorbent with a regenerant stripping solution comprising a non-chelating weak acid having a $pk_a$ of about 3 to about 7.5, and which is selected from the group consisting of dimeric, trimeric, oligomeric, and polymeric carboxylates, wherein an ammonium salt solution is formed producing a spent stripping solution and regenerated sorbent; and
   d. separating said spent stripping solution from said regenerated sorbent.

* * * * *